(12) United States Patent
Dowty

(10) Patent No.: US 10,661,903 B2
(45) Date of Patent: May 26, 2020

(54) AIRCRAFT PASSENGER SUITE SEATING ARRANGEMENTS WITH ALL AISLE ACCESS

(71) Applicant: B/E Aerospace, Inc., Wellington, FL (US)

(72) Inventor: Mark B. Dowty, Rural Hall, NC (US)

(73) Assignee: B/E Aerospace Inc., Winston-salem, NC (US)

( * ) Notice: Subject to any disclaimer, the term of this patent is extended or adjusted under 35 U.S.C. 154(b) by 522 days.

(21) Appl. No.: 15/436,482

(22) Filed: Feb. 17, 2017

(65) Prior Publication Data
US 2017/0240283 A1 Aug. 24, 2017

Related U.S. Application Data

(60) Provisional application No. 62/296,659, filed on Feb. 18, 2016.

(51) Int. Cl.
*B64D 11/06* (2006.01)

(52) U.S. Cl.
CPC ...... *B64D 11/0605* (2014.12); *B64D 11/0601* (2014.12); *B64D 11/0604* (2014.12); *B64D 11/0606* (2014.12)

(58) Field of Classification Search
CPC ............ B64D 11/0606; B64D 11/0604; B64D 11/0602; B64D 11/0601; B60N 2/01
See application file for complete search history.

(56) References Cited

U.S. PATENT DOCUMENTS

| 8,998,139 | B2* | 4/2015 | Dryburgh | B64D 11/06 244/118.6 |
|---|---|---|---|---|
| 9,315,270 | B2* | 4/2016 | Dryburgh | B64D 11/06 |
| 9,409,648 | B2* | 8/2016 | Eakins | B64D 11/06 |
| 9,446,848 | B2* | 9/2016 | Jerome | B60N 2/34 |
| 9,533,765 | B2* | 1/2017 | Vergnaud | B64D 11/06 |
| 9,718,550 | B2* | 8/2017 | Ko | B64D 11/06 |
| 9,783,302 | B2* | 10/2017 | Eakins | B64D 11/06 |
| 9,944,397 | B2* | 4/2018 | Vergnaud | B64D 11/06 |
| 2012/0292957 | A1* | 11/2012 | Vergnaud | B64D 11/06 297/188.08 |
| 2013/0068887 | A1* | 3/2013 | Ko | B64D 11/06 244/118.6 |
| 2014/0283296 | A1* | 9/2014 | Jerome | B60N 2/34 5/12.1 |
| 2014/0306500 | A1* | 10/2014 | Dryburgh | B64D 11/06 297/232 |
| 2015/0166184 | A1* | 6/2015 | Dryburgh | B64D 11/06 244/118.6 |

(Continued)

*Primary Examiner* — Philip J Bonzell
(74) *Attorney, Agent, or Firm* — Clements Bernard Walker

(57) ABSTRACT

In an illustrative embodiment, a premium class seating arrangement for an aircraft cabin includes at least three passenger suites, each passenger suite including a seat movable between an upright position and a horizontal bed position and an ottoman which expands a surface area of the bed position. The passenger suites may cooperatively form a nested arrangement capable of nesting with identical passenger suite arrangements longitudinally within the cabin area. At least two of the ottomans of the passenger suites may be longitudinally offset in installation position. Each passenger suite in the arrangement is afforded direct aisle access without interference by another passenger suite.

6 Claims, 44 Drawing Sheets

(56) References Cited

U.S. PATENT DOCUMENTS

| | | | |
|---|---|---|---|
| 2015/0329208 A1* | 11/2015 | Eakins | B64D 11/06 297/232 |
| 2016/0311535 A1* | 10/2016 | Eakins | B64D 11/06 |
| 2017/0029117 A1* | 2/2017 | Vergnaud | B64D 11/06 |
| 2017/0088267 A1* | 3/2017 | Dowty | B64D 11/00153 |
| 2017/0129611 A1* | 5/2017 | Morgan | B64D 11/0606 |
| 2017/0259921 A1* | 9/2017 | Valdes De La Garza | B64D 11/0638 |
| 2017/0369171 A1* | 12/2017 | Eakins | B64D 11/06 |

* cited by examiner

AIRCRAFT PASSENGER SUITE SEATING ARRANGEMENTS WITH ALL AISLE ACCESS

RELATED APPLICATIONS

This application claims priority to U.S. Provisional Application No. 62/296,659 filed Feb. 18, 2016, the contents of which is hereby incorporated by reference in its entirety.

BACKGROUND

Premium seating classes on long-haul carriers can be equipped with individual passenger suites for enhanced privacy and comfort. Suites can include lie-flat capable seats, ottomans, audio/video equipment, tables and closets, among other amenities. Suites are typically found on wide-body jets where more space is available for accommodating the travel preferences of premium class passengers who can afford to pay higher fares for more space, privacy, conveniences and luxuries.

With all seating classes, there is a need to arrange the seats to maximize density without compromising space, privacy, and accessibility. On current wide-body jets, suites are arranged into a center column and outboard columns, and suite access is provided directly from the longitudinal aisles that run from the front to the back of the passenger cabin. As such, each suite is required to be positioned adjacent to one of the longitudinal aisles, or access to an outboard suite provided through an adjacent inboard suite, disadvantageously interrupting the privacy of the passenger seated in the inboard suite. Such arrangements also limit the number of suites that can be positioned abreast and/or requires the suites to be positioned at an angle to the longitudinal axis of the aircraft.

SUMMARY OF ILLUSTRATIVE EMBODIMENTS

The forgoing general description of the illustrative implementations and the following detailed description thereof are merely exemplary aspects of the teachings of this disclosure, and are not restrictive.

The present disclosure relates generally to airline seating arrangements, and more particularly, to seating arrangements for passenger suites including lie-flat seating. The lie-flat seating may include an adjustable seat which extends upon moving to horizontal to meet a corresponding ottoman, completing the lie-flat bed. The passenger seating arrangements may include an aisle suite and a window suite. In further configurations, passenger seating arrangements may include a middle suite arranged between an aisle suite and a window suite, wherein each suite has unimpeded aisle access. Accordingly, the object of the present disclosure is to provide seating arrangements which overcome the above-mentioned limitations of suite density, suite privacy, and/or suite accessibility.

The seating arrangements of the certain embodiments maximize suite density and suite privacy while providing suite accessibility by grouping several suites together and having for each suite a specific orientation, a partition and a dedicated access leading to an aisle.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values or dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
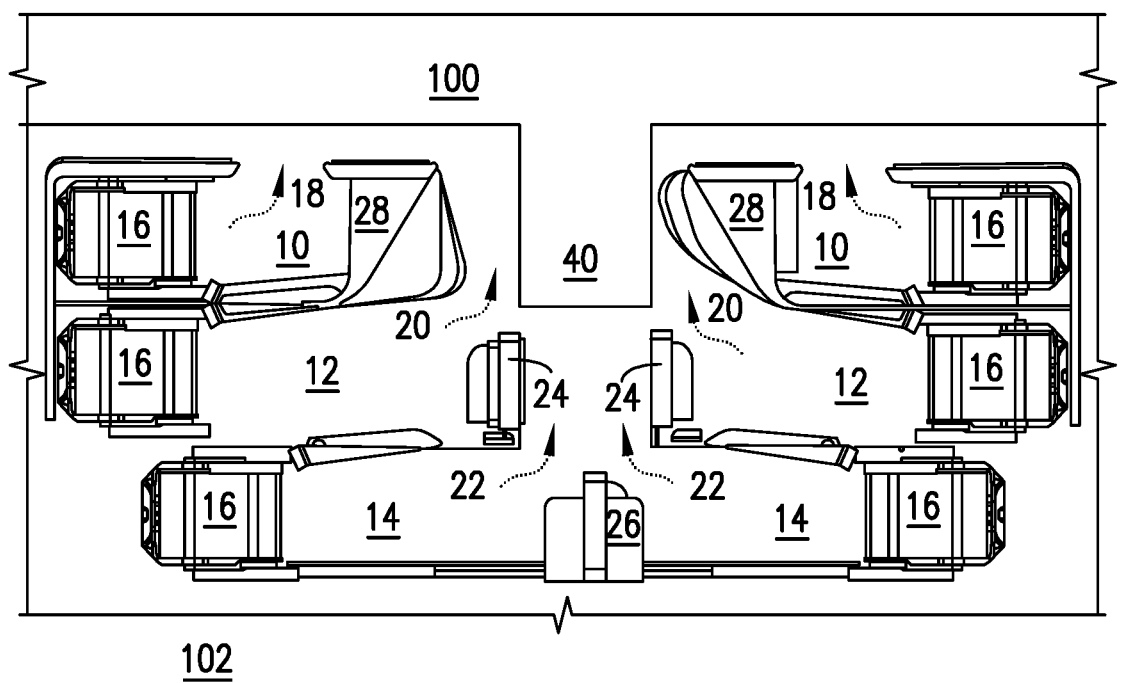
FIG. 1 is a top view of a triplet seating arrangement for aircraft passenger suites according to a first example embodiment.
Figure 2:
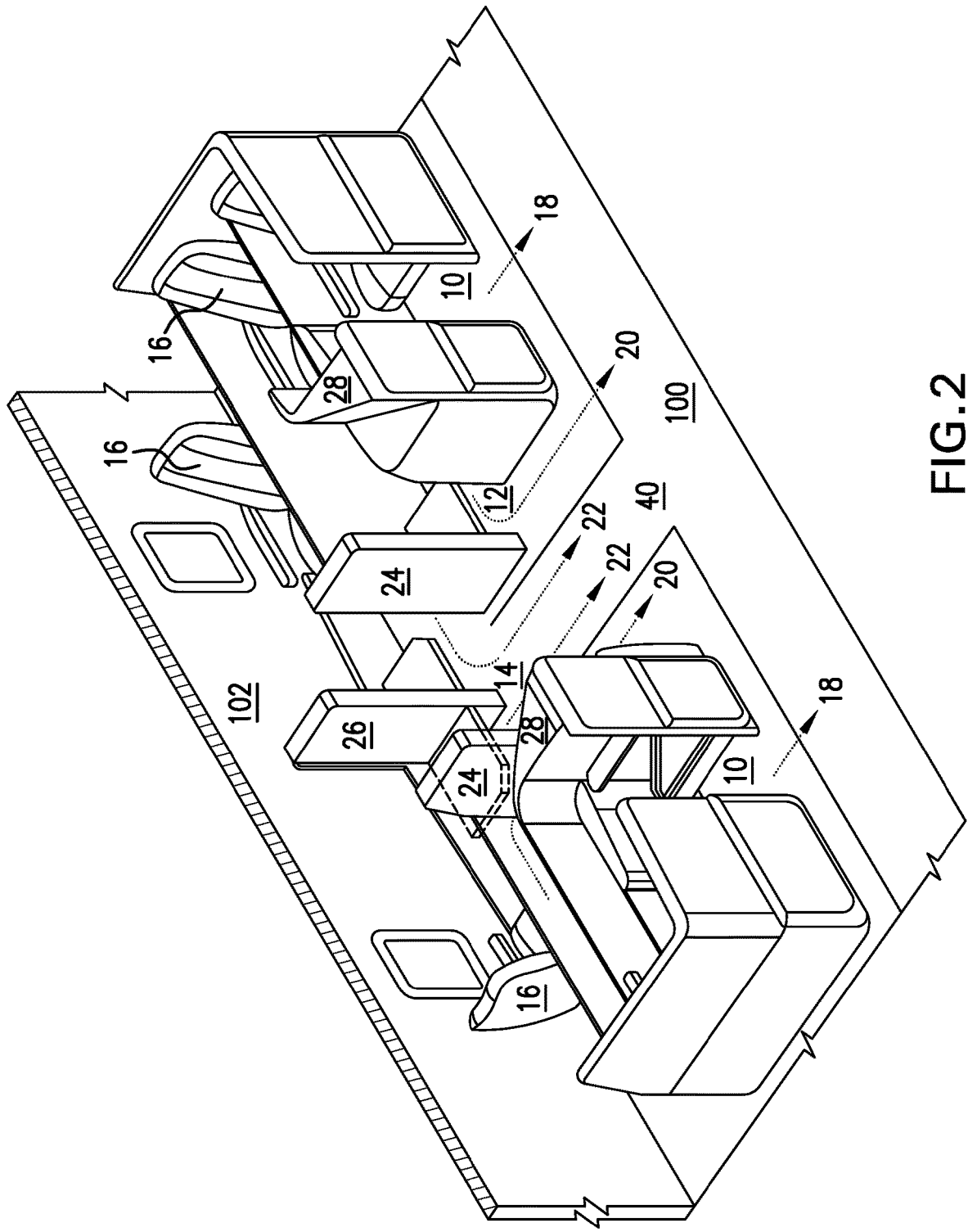
FIG. 2 is a perspective view of the triplet seating arrangement of FIG. 1.
Figure 3:
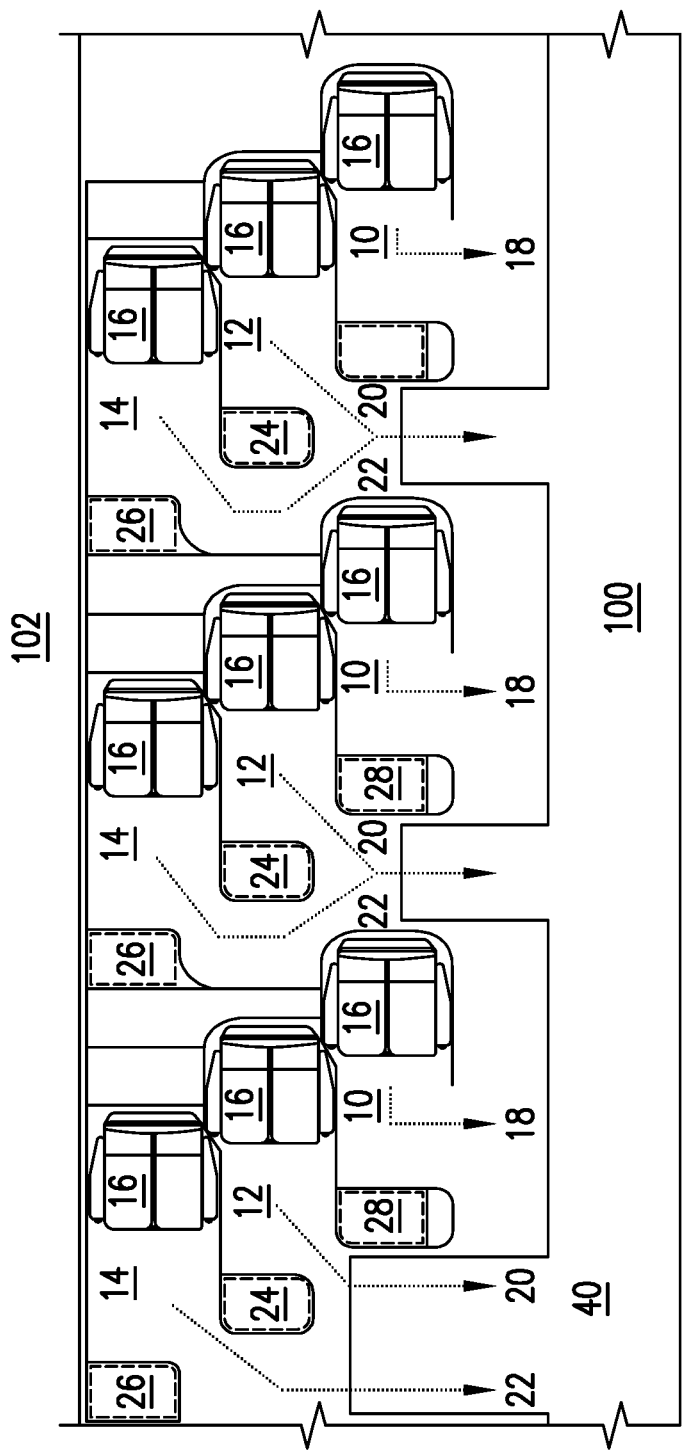
FIG. 3 is a top view of a triplet seating arrangement for aircraft passenger suites according to a second example embodiment.

The description set forth below in connection with the appended drawings is intended as a description of various embodiments of the disclosed subject matter and is not necessarily intended to represent the only embodiments. In certain instances, the description includes specific details for the purpose of providing an understanding of the disclosed embodiments. However, it will be apparent to those skilled in the art that the disclosed embodiments may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

The seating arrangements presented in this disclosure are adapted for an airplane or other conveyance generally having a wall, at least one longitudinal aisle running parallel to the wall, and space there between for accommodating e seating arrangement. The wall may be an interior wall or an exterior wall. In the case of an airplane, the wall may be the windowed exterior wall of the aircraft fuselage.

Referring now to FIGS. 1-26, triplet seating arrangements of airline passenger suites according to several embodiments are illustrated. The triplet seating arrangements can include three suites abreast occupying the space between an aisle 100 and a wall 102, an aisle suite 10, a middle suite 12, and a window suite 14.

Each suite 10, 12, 14 includes a seat 16 therein, the longitudinal axis thereof oriented substantially parallel to the respective suite axis. While only a portion of the seat frame is shown for clarity, it is intended that each seat include at least an adjustable seat back and seat bottom, and more preferably, a seat bottom, seat back and partial leg rest that adjust to cooperatively form a horizontal bed with a corresponding ottoman during flight for maximum comfort. As such, a suitable amount of open floor space is provided immediately forward of each seat 16 to accommodate pivoting and/or horizontally translating seating surfaces to allow the seat to adjust from an upright sitting position to a horizontal sleeping position.

Each suite 10, 12, 14 can also be equipped with audio/video equipment, deployable tables and other conventional amenities. A video monitor can be positioned directly forward of each seat 16, such as mounted to an aisle suite partition, middle suite partition, and shared window suite partition.

Each suite 10, 12 and 14 is equipped with its own dedicated entrance to provide unimpeded access to the aisle 100 from the respective suite. Accesses to aisle suite 10, the middle suite 12, and window suite 14 are provided through an aisle suite entrance 18, a middle suite entrance 20 and a window suite entrance, respectively.

Each suite 10, 12, 14 may include an ottoman 24, 26, 28 designed to coordinate with the seat to provide a lie-flat bed seating position. In some implementations, to improve aisle accessibility, the ottomans are articulable to a stowed position or may slide within a compartment, clearing a path for aisle access. The ottomans 24, 26, 28, additionally or alternatively, may include a tapered shape to provide greater aisle access. For example, ottomans 24 of FIG. 7 have a tapered design. The style of ottoman may vary based upon suite position. For example, aisle-side ottomans 28 may be stationary due to direct aisle access, while middle suite ottomans 24 may be capable of flipping against the side or rear partition to clear additional space for exit access. Due to spacing between window-side suites 14, in some embodiments, the ottomans 26 may be stowable, for example within a storage compartment or cubby area arranged between window-side suites 14.

Each triplet seating arrangement is designed to maximize a number of suites, suite privacy, and to provide unimpeded access to the aisle 100 by having for each suite an orientation, access entrance, ottoman design, and partitions.

In some embodiments, the aisle suite 10, the middle suite 12, and window suite 14 are positioned and oriented to allow a greater number of suites to be positioned abreast, to maximize suite privacy, and to provide unimpeded access to the aisle 100 for each suite.

The aisle suite 10 can be positioned adjacent the aisle 100, the window suite 14 can be positioned adjacent the wall 102, and the middle suite 12 can be positioned between the aisle suite 10 and the window suite 14. Each suite of the triplet seating arrangement 10, 12, 14, in some embodiments, defines a longitudinal suite axis oriented substantially parallel to the longitudinal axis of the aisle 100, which may be oriented parallel to the longitudinal axis of the aircraft. In other embodiments, one or more of the suites may be perpendicular to the longitudinal axis of the aisle 100. In further embodiments, some or all of the seats may be arranged at an angle to the axis of the aisle 100.

In some examples, all the suites of the triplet seating arrangement 10, 12, 14 can have a common orientation, e.g. forward, aftward, window, aisle, as illustrated in FIGS. 1-4.

Figure 19:
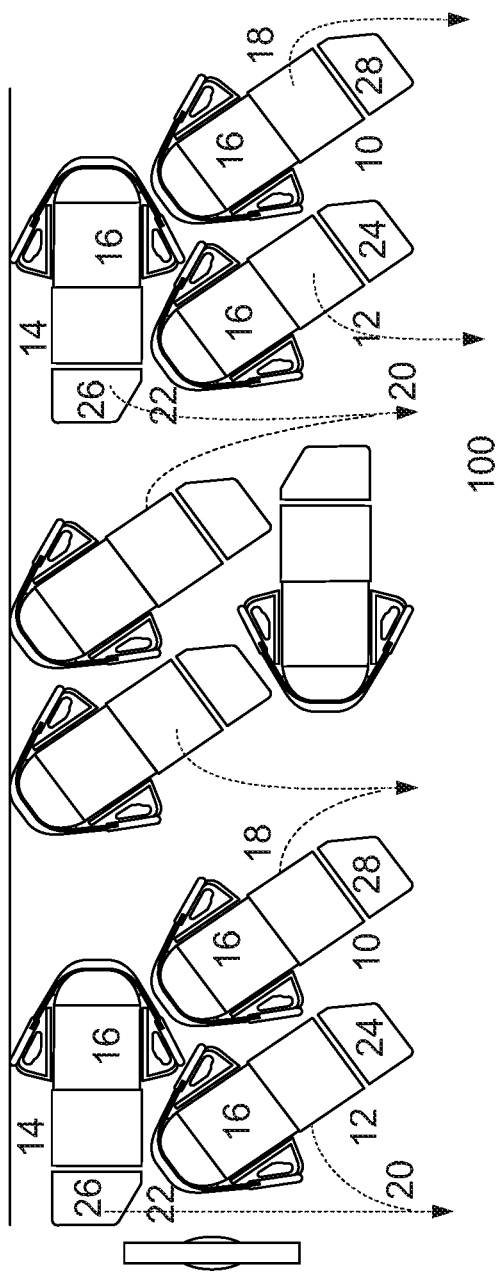
FIG. 19 is a top view of a triplet seating arrangement for aircraft passenger suites according to an eleventh example embodiment.
Figure 20:
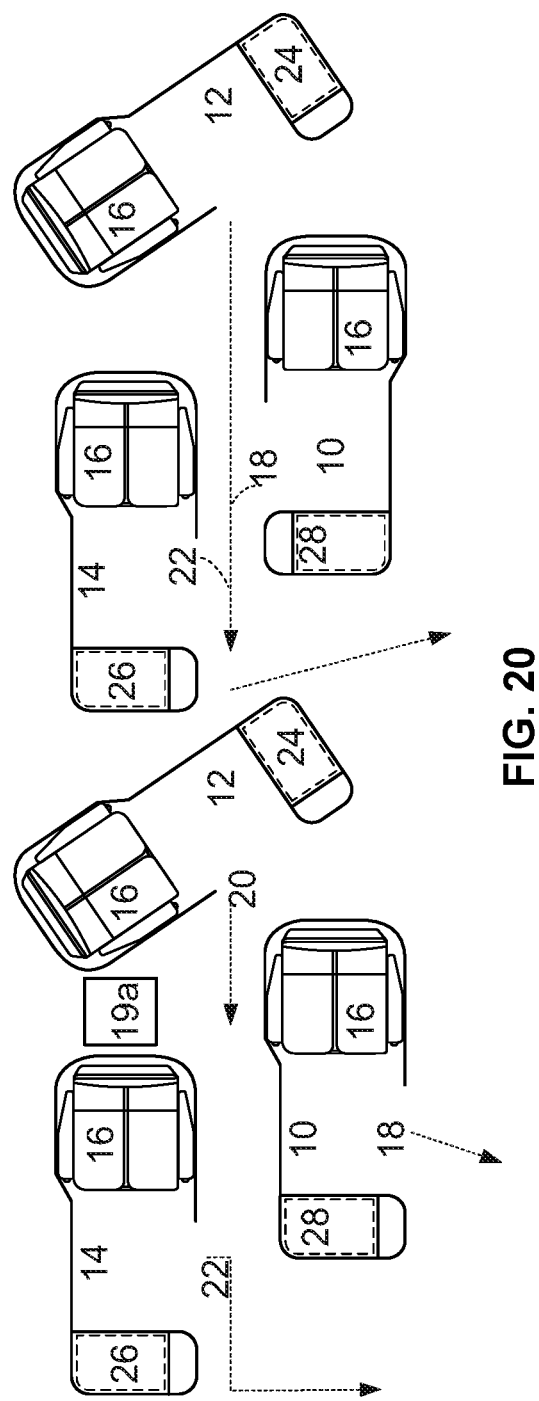
FIG. 20 is a top view of a triplet seating arrangement for aircraft passenger suites according to a twelfth example embodiment.

In other examples, two suites of the triplet seating arrangement 10, 12, 14 can have a first orientation, e.g. forward backward, while the remaining suite of the triplet seating arrangement 10, 12, 14 can have a second orientation different from the first orientation, e.g. window, aisle, as illustrated in FIGS. 5-20. In addition, the first orientation and the second orientation can be opposite from each other, as illustrated in FIGS. 5-14, substantially perpendicular from each other, as illustrated in FIGS. 15-18, or oblique from each other, as illustrated in FIGS. 19-20.

In other examples, the aisle suite 10 can have an aisle suite orientation, the middle suite 12 can have a middle suite orientation, and window suite 14 can have a window suite orientation such that the aisle suite orientation, the middle suite orientation, and the window suite orientation are all different from each other, as illustrated in FIGS. 21-26.

In other examples, two seatbacks of the triplet seating arrangement 10, 12, 14 can be aligned parallel to a lateral plane bisecting aisle 100, the remaining seatback of the triplet seating arrangement 10, 12, 14 can be laterally offset from the lateral plane, as illustrated in FIGS. 1-2, 5-14. Although window suite 14 is laterally offset relative to aisle suite 10 and middle suite 12, each of the suites 10, 12, 14 has about an equal total length. While middle suite 12 is generally open or uncovered, a portion of aisle suite 10 is covered by ottoman 28.

In other examples, all seat backs of the triplet seating arrangement 10, 12, 13 are offset from each other, as illustrated in FIGS. 3-4, 9, 20.

In some configurations, the aisle suite entrance 18, the middle suite entrance 20, and the window suite entrance 22 have spatial configurations to allow a greater number of suites to be positioned abreast, to maximize suite privacy, and to provide unimpeded access to the aisle 100 for each suite.

In some examples, the aisle suite entrance 18 can be directly adjacent the aisle 100, as illustrated in FIGS. 1-20 or can be spaced from the aisle 100 to go along the middle suite 12 and/or window suite 14, as illustrated in FIGS. 15-19, 23-26.

The middle suite entrance 20 can be spaced from the aisle 100 at a distance about a width of aisle suite 10, as illustrated in FIGS. 1-14 or be spaced from the aisle at a distance about half a length of the middle suite 12, as illustrated in FIGS. 15-19, 23-26.

The window suite entrance 22 can be spaced from the aisle 100 at a distance about the combined widths of aisle suite 10 and middle suite 12, as illustrated in FIGS. 1-14, 19-20, be spaced from the aisle 100 at a distance about half a length of the middle suite 12, as illustrated in FIGS. 15-18, or be spaced at a distance about a full length of the middle suite 12, as illustrated in FIGS. 19, 21-26.

In other examples, the aisle suite entrance 18, the middle suite entrance 20, and the window suite entrance 22 lead into a shared aisle 40, which can branch laterally off from the main aisle 100, as illustrated in FIGS. 13, 15-18, 23-24 or only the middle suite entrance 20 and window suite entrance 22 lead into a shared aisle 40, which branches laterally off from the main aisle 100, as illustrated in FIGS. 1-2, 5-8, 10-11, 25-26.

In some embodiments, partitions can serve to define the boundaries of the suites, offer a degree of privacy, and support amenities such as video monitors. In some examples, the middle suite entrance 20 can be between the aisle suite partition 28 and the middle suite partition 24, while the window suite entrance 22 can be between the middle suite partition 24 and the window suite partition 26, as illustrated in FIGS. 1-4. Partitions can have any vertical height, but preferably extend to a height of about 120 cm to about 180 cm.

In some embodiments, a passenger seating arrangement may be surrounded by partitions or privacy walls such that passengers seated within the passenger seating arrangement are grouped in an enclosed seating cluster. The seating cluster, for example, may encourage socialization between the passengers within the passenger seating arrangement while providing a degree of privacy for each passenger within the passenger seating arrangement. For example, partitions may separate visibility between passengers at least within a head region of each individual passenger suite. The partitions, in some embodiments, are articulable such that passengers may lower the internal privacy partitions to encourage socialization. Passenger suites grouped within a passenger seating arrangement surrounded by shared privacy partitions or a privacy wall, in some embodiments, may share seating arrangement amenities. For example, passengers occupying the passenger suites within the passenger seating arrangement of FIG. 18 share the beverage center 19e or conference table 19d.

In some configurations, several triplet seating arrangements are grouped in suite clusters having different orientations and spatial configurations to maximize a number of suites within the cabin, to maximize the suite privacy, and/or to provide unimpeded access to the aisle 100 for each suite.

In some examples, suite clusters can be formed by placing substantially identical triplet seating arrangements 10, 12, 14 through a translational symmetry following an imaginary axis of translation substantially parallel to the aisle 100 and/or the wall 102, as illustrated in FIGS. 3-8, 12, 14, 20, 23-24.

In other examples, suite clusters can be formed by placing substantially identical triplet seating arrangements 10, 12, 14 through a reflectional symmetry following an imaginary axis of symmetry substantially perpendicular to the aisle 100 and/or the wall 102, as illustrated in FIGS. 1-2, 10-11, 7-8, 10-11, 14, 23-26.

Figure 21:
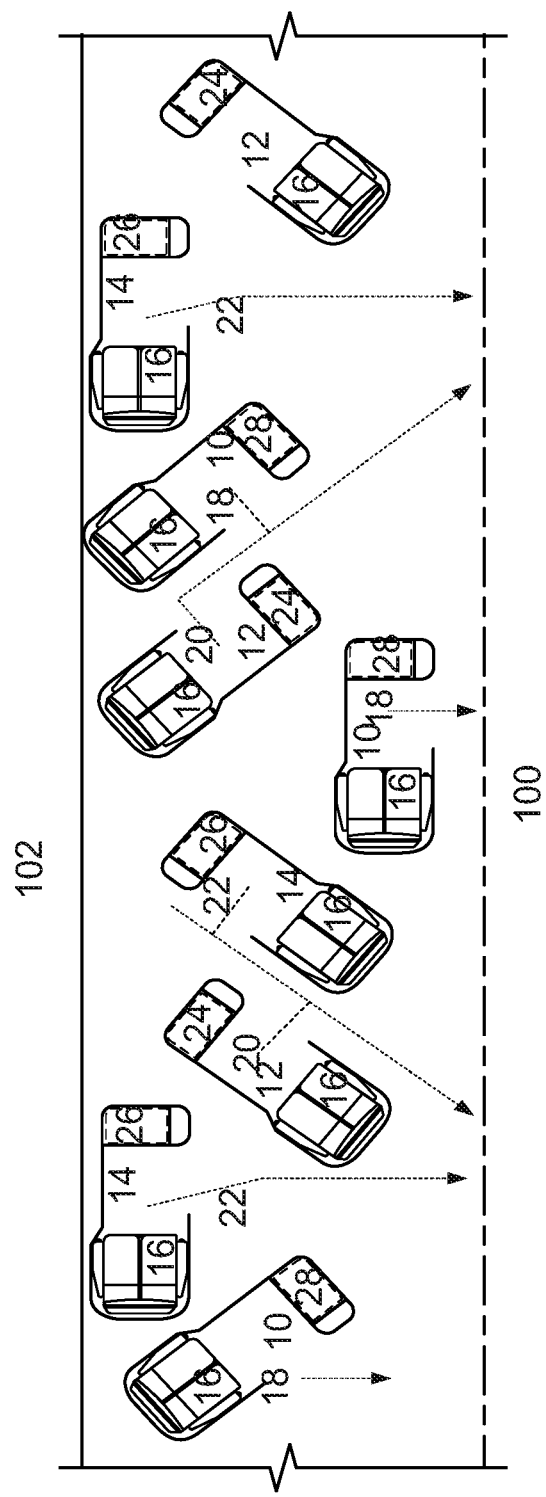
FIG. 21 is a top view of a triplet seating arrangement for aircraft passenger suites according to a thirteenth example embodiment.
Figure 22:
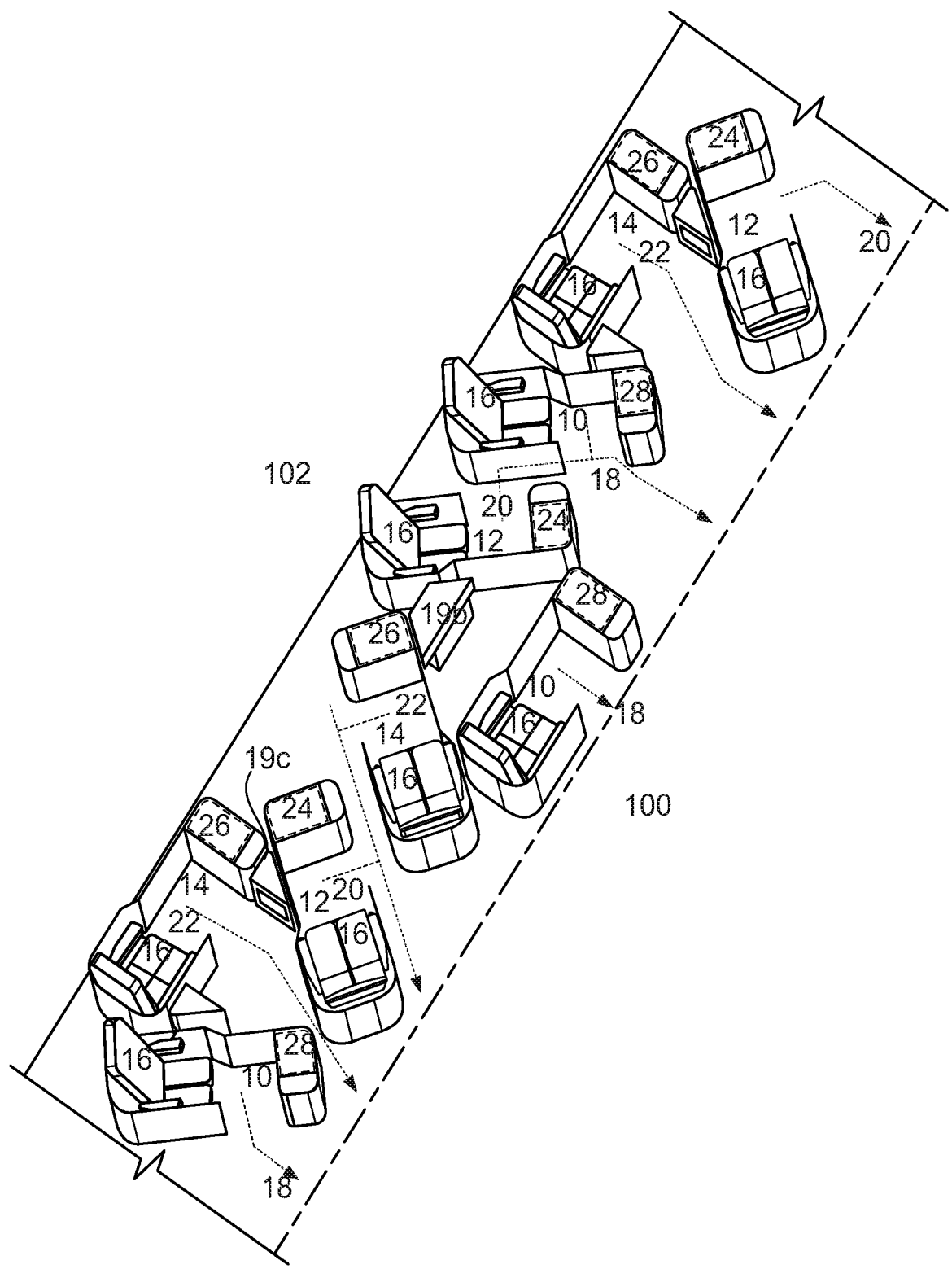
FIG. 22 is a perspective view of triplet seating arrangement of FIG. 21.

In other examples, suite clusters can be formed by placing substantially identical triplet seating arrangements 10, 12, 14 through a translational symmetry and a rotational symmetry following an imaginary axis of symmetry substantially perpendicular to the aisle 100 and/or the wall 102 and following an imaginary point of symmetry substantially centered in the triplet seating arrangement 10, 12, 14, as illustrated in FIGS. 19, 21, and 22.

Figure 9:
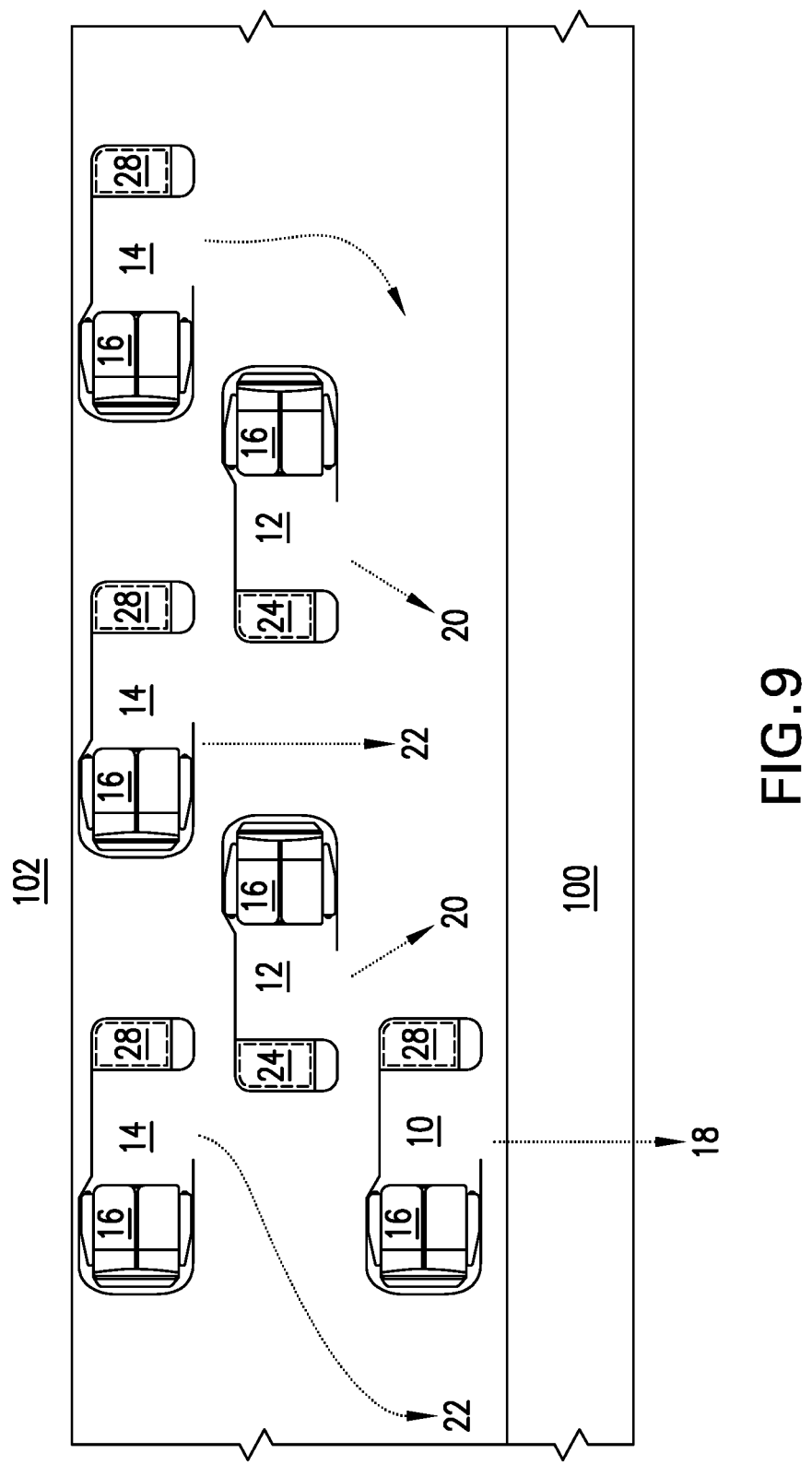
FIG. 9 is a top view of a triplet seating arrangement for aircraft passenger suites according to a fourth example embodiment.
Figure 10:
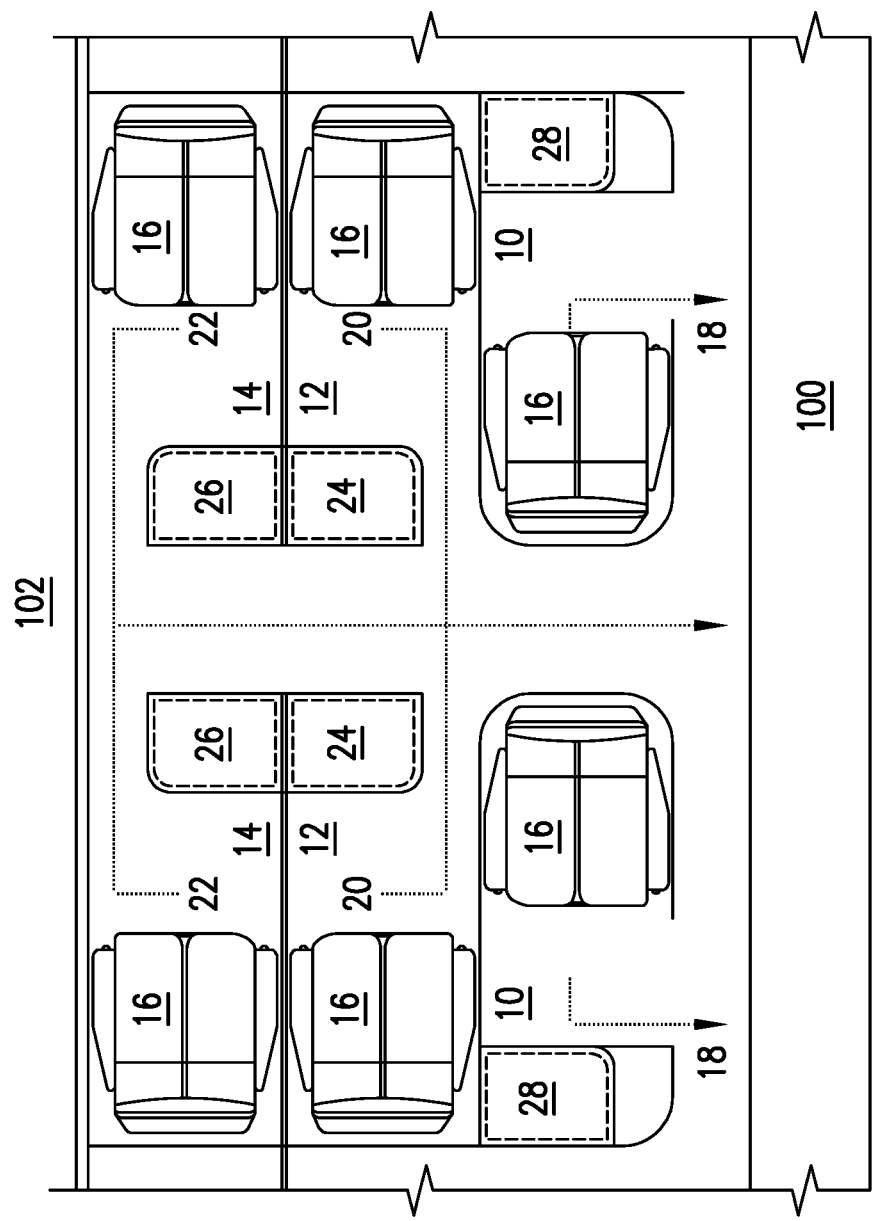
FIG. 10 is a top view of a triplet seating arrangement for aircraft passenger suites according to a fifth example embodiment.
Figure 11:
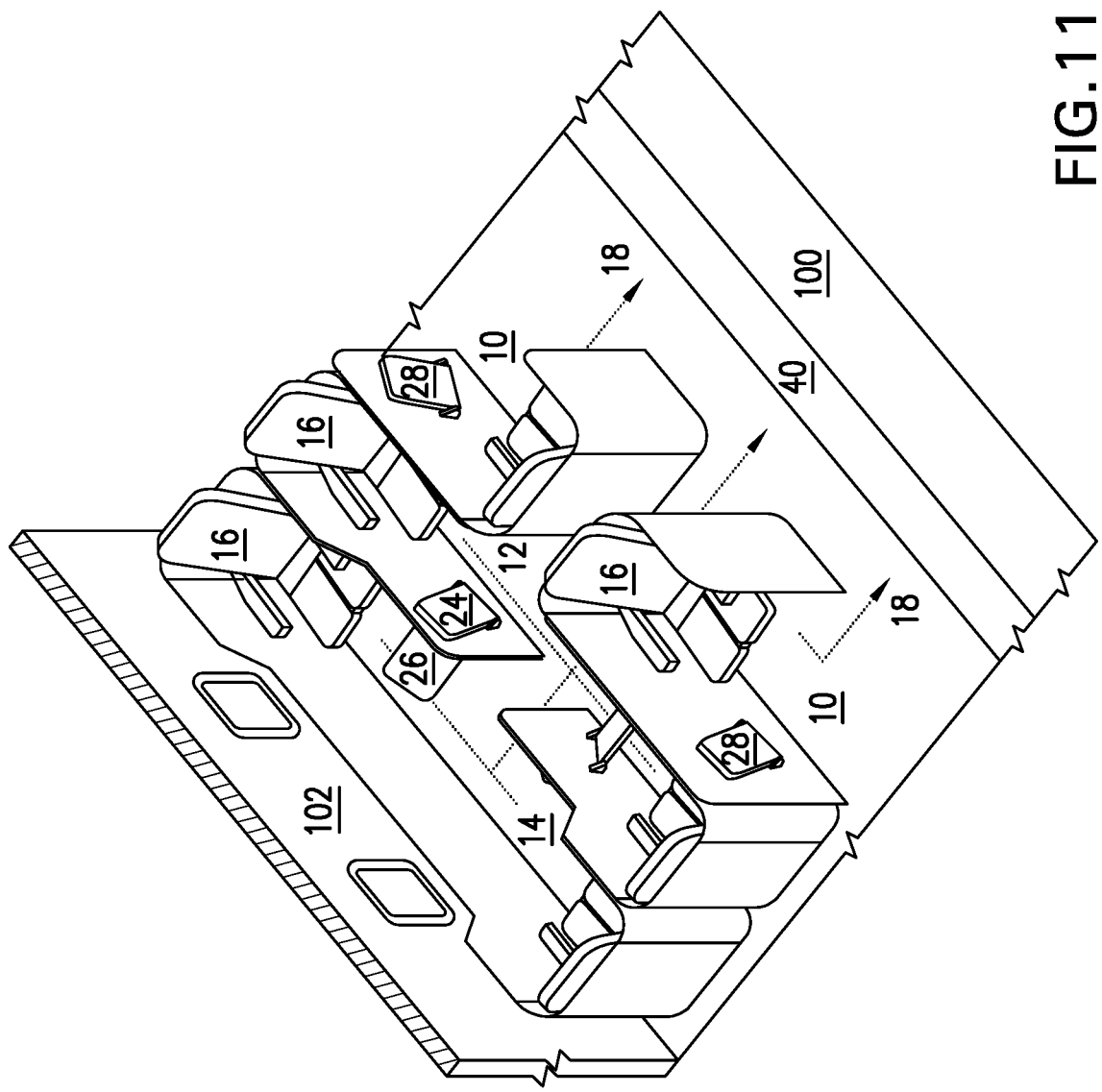
FIG. 11 is a perspective view of the triplet seating arrangement of FIG. 10.
Figure 12:
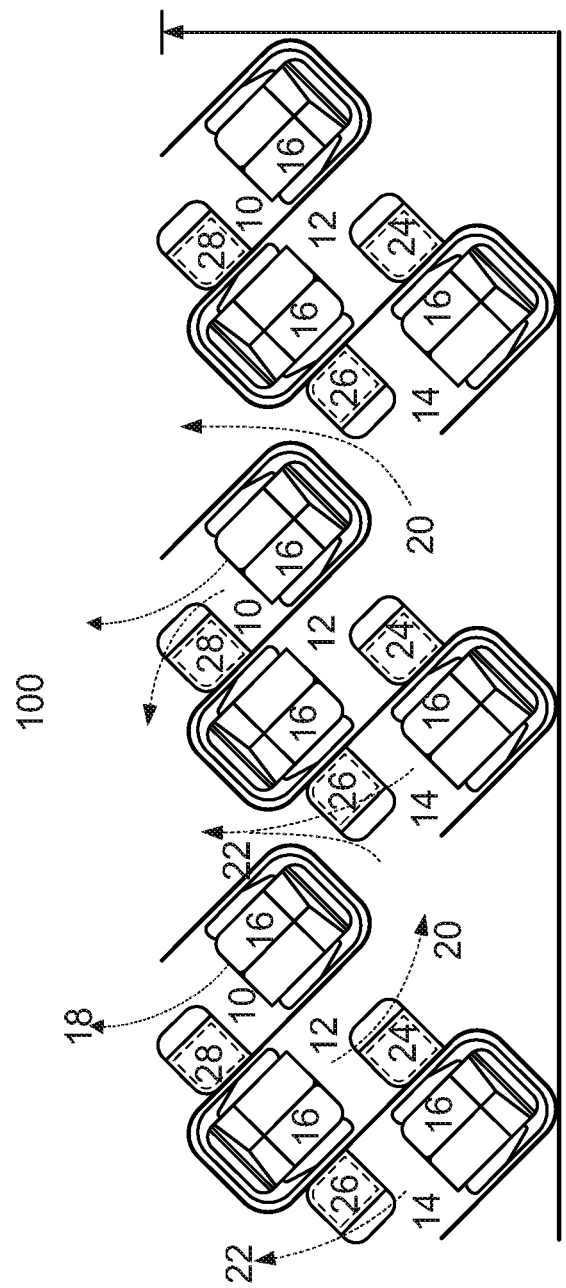
FIG. 12 is a top view of a triplet seating arrangement for aircraft passenger suites according to a sixth example embodiment.

In another example, a suite cluster can be formed by placing non identical triplet seating arrangements 10, 12, 14 side by side, as illustrated in FIG. 9. A first triplet seating arrangement adjacent to a second triplet seating arrangement can have the middle suite 12 offset in aftward direction from the aisle suite 10 and the window suite 14 while the second triplet seating arrangement can be similar to the first triplet seating arrangement but without the aisle suite 10, as illustrated in FIG. 9.

Figure 27:
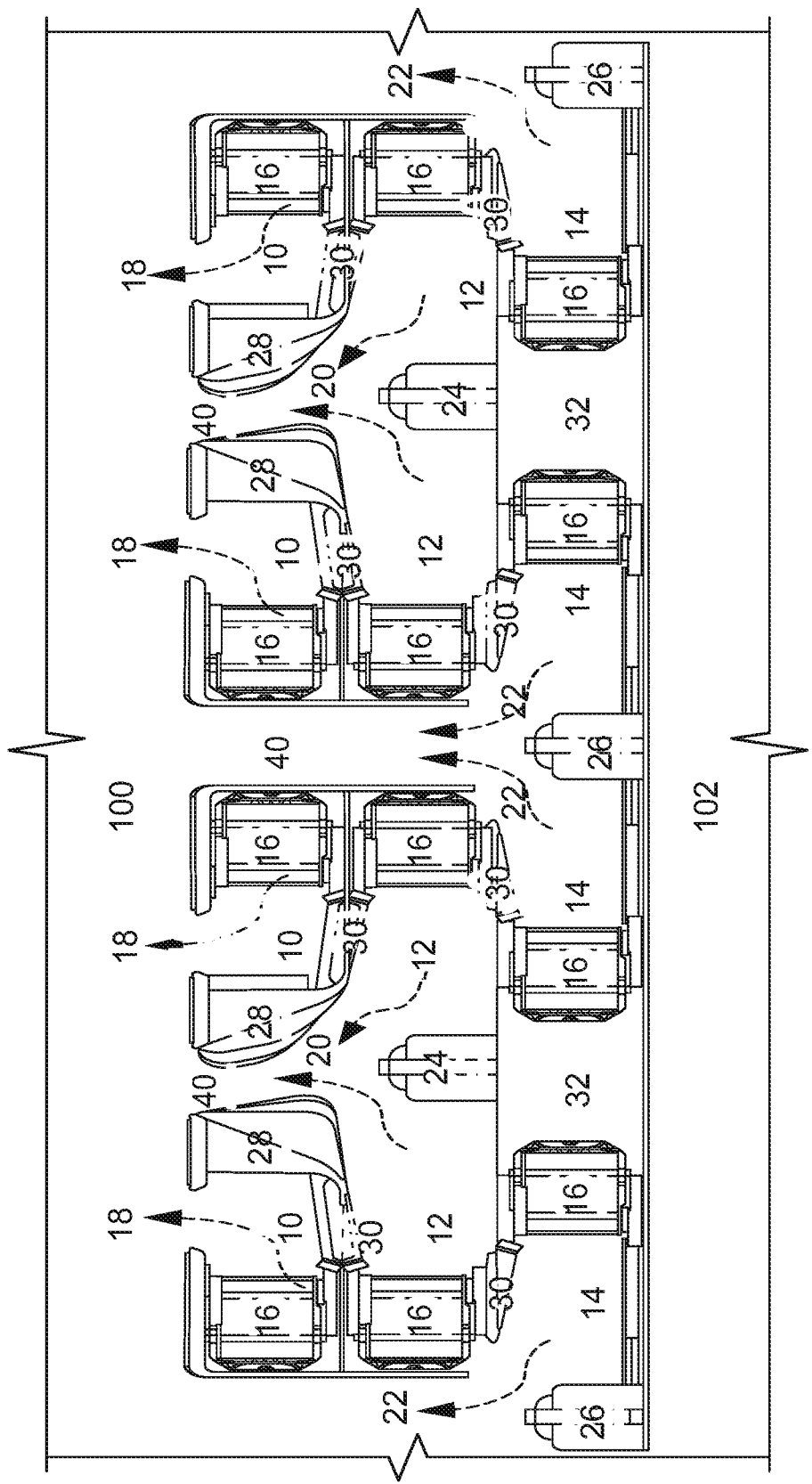
FIG. 27 is a top view of a triplet seating arrangement with a duet seating arrangement according to an example embodiment.
Figure 28:
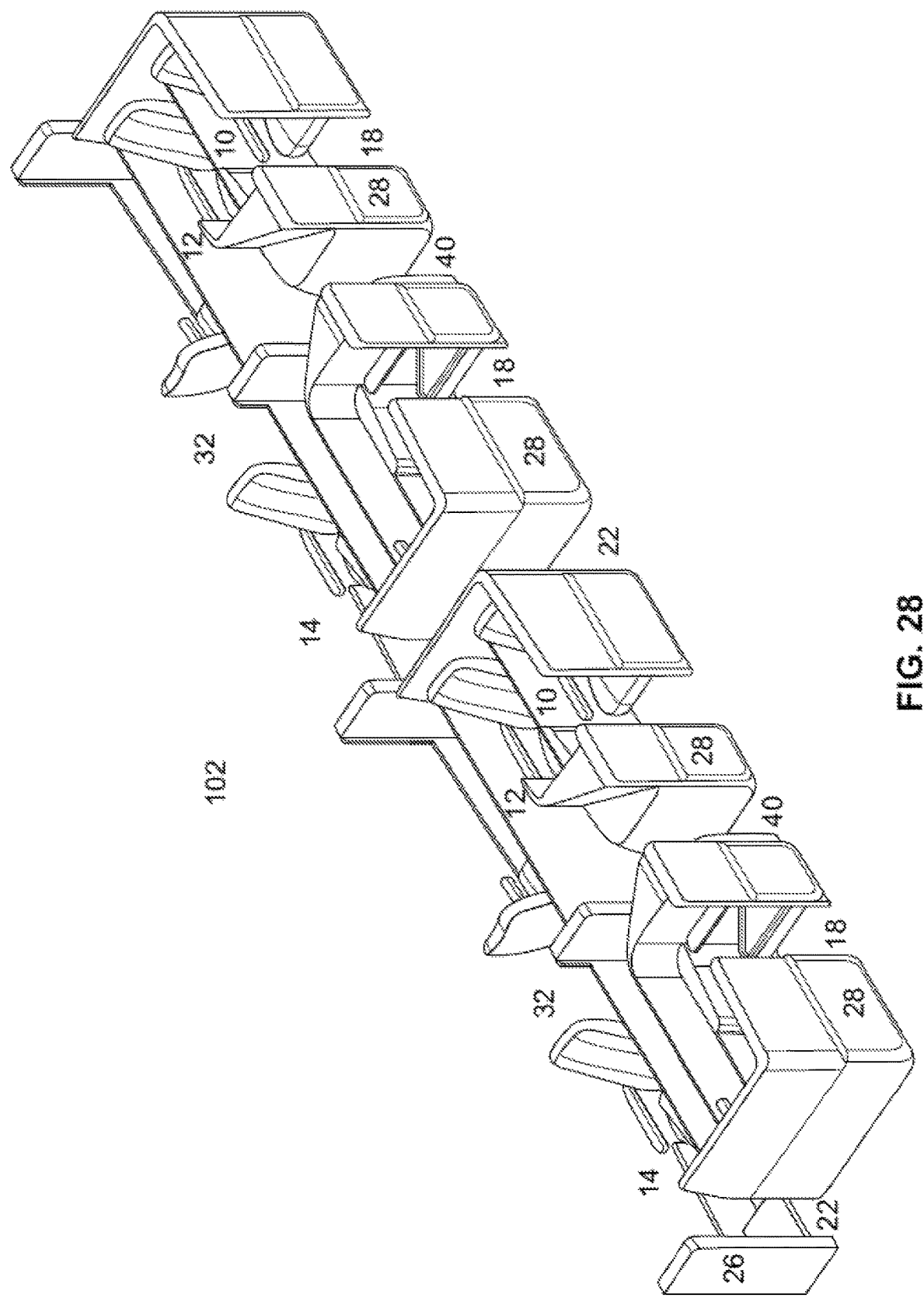
FIG. 28 is a perspective view of the duet seating arrangements of FIG. 27.

Referring now to FIGS. 27-28, a triplet seating arrangement for airline passenger suites according to one embodiment is illustrated. Like the previously described triplet seating arrangements, the triplet seating arrangement illustrated in FIGS. 27-28 can include three suites abreast occupying the space between the aisle 100 and the wall 102. The suites include an aisle suite 10, a middle suite 12, and a window suite 14. The aisle suite 10 is positioned adjacent the aisle 100, the window suite 14 is positioned adjacent the wall 102, and the middle suite 12 is positioned between the aisle suite 10 and the window suite 14. Each of the three suites 10, 12, 14 defines a longitudinal suite axis oriented substantially parallel to the longitudinal axis of the aisle 100, which may be oriented along the longitudinal axis of the aircraft.

Each suite 10, 12, 14 includes a seat 16, the longitudinal axis thereof oriented substantially parallel to the respective suite axis. The seats 16 in aisle suite 10 and middle suite 12 both face in the same direction, while the seat 16 in window suite 14 faces in the opposite direction. While only a portion of the seat frame is shown for clarity, it is intended that each seat include at least an adjustable seat back and seat bottom, and more preferably, a seat bottom, seat back and leg rest that adjusts to cooperatively form a horizontal bed during flight for maximum comfort. As such, a suitable amount of open floor space is provided immediately forward of each seat 16 to accommodate pivoting and/or horizontally translating seating surfaces to allow the seat to adjust from an upright sitting position to a horizontal sleeping position. Although not shown, each suite 10, 12, 14 can also be equipped with audio/video equipment, deployable tables and other conventional amenities. A video monitor can be positioned directly forward of each seat 16, such as mounted to the partition wall.

Access to aisle suite 10 is provided through aisle suite entrance 18. Access to middle suite 12 is provided through middle suite entrance 20. Access to window suite 14 is provided through window suite entrance 22. Aisle suite entrance 18 is directly adjacent the aisle 100. Middle suite entrance 20 is spaced from the aisle 100 a distance about the width of aisle suite 10. Window suite entrance 22 is spaced from the aisle 100 a distance about the combined widths of aisle suite 10 and middle suite 12. Middle suite entrances 20 of facing middle suites 12 into a common shared aisle 40 while window entrances 22 of facing window suites 14 funnel into a common shared aisle 40 separate from the common shared aisle 40 of the facing middle suites 12. As such, there are separate, dedicated laterally branching shared aisles 40 for accessing the middle suites 12 and the window suites 14.

Middle suite entrance 20 is formed between aisle suite ottomans 28 and middle suite ottoman 24, while window suite entrance 22 is formed between the back end of middle suite 12 and window suite ottoman 26. Partitions of the suites 10, 12, and 14 serve to define the boundaries of the suites, offer a degree of privacy, and support amenities such as video monitors.

Seat 16 of aisle suite 10 and middle suite 12 are aligned about a common lateral axis and face in the same direction, while seat 16 of window suite 14 is laterally offset about that common axis and faces in the opposite direction. This arrangement provides open space 32 between longitudinally adjacent window suite 14 back ends for storage, locating amenities, etc.

The aisle suite 10 and middle suite 12 face like suites and form a four-suite cluster, while the window suite 14 faces a like window suite and forms a two-suite cluster. These four-suite clusters can be arranged longitudinally adjacent one another to form an inboard common adjacent the aisle 100, while these two-suite clusters can be arranged longitudinally adjacent one another to form an outboard column adjacent the wall 102. The shared aisles 40 for accessing the middle suites 12 are generally centered within the four suite clusters, while the shared aisles 40 for accessing the window suites 14 are formed between adjacent four-suite clusters.

Laterally adjacent suites are separated by suite partitions, in some embodiments, can be raised or deployed to divide laterally adjacent suites and lowered or stowed to connect laterally adjacent suites. Suitable examples of deployable partitions include, but are not limited to vertically deployable partitions, horizontally deployable partitions, pivoting video monitors, etc.

Each suite 10, 12, 14 is elongate and therefore defines a longitudinal suite axis and a lateral suite axis. The longitudinal suite axis can be oriented substantially parallel to the longitudinal axis of the airplane. In this triplet seating arrangement, all seats within the suites can be either directly forward facing or directly rearward facing. Flight attendant and galley components can be located immediately forward and/or rearward of the suites.

Figure 29:
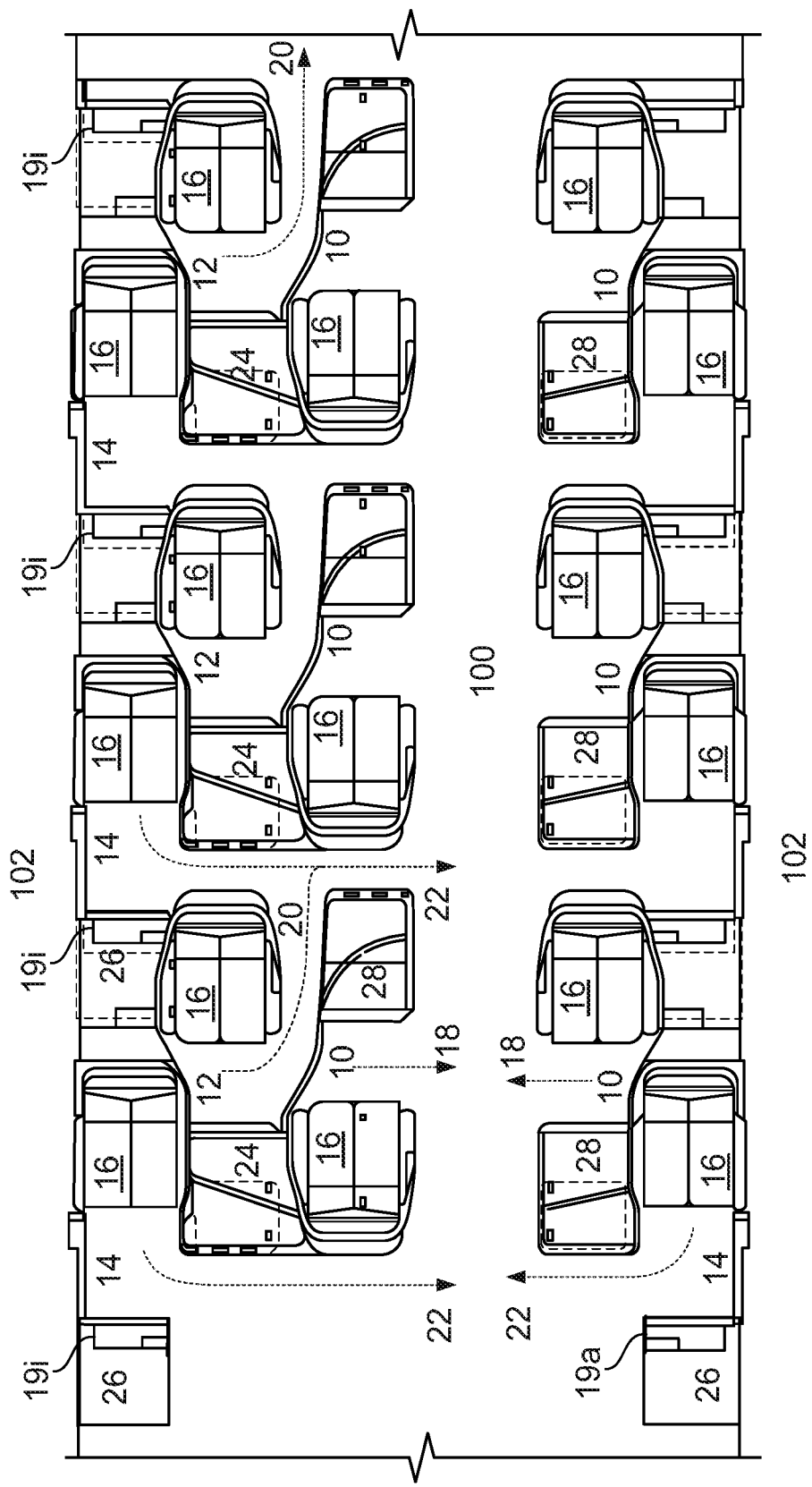
FIG. 29 is a top view of triplet seating arrangements and duet seating arrangements for aircraft passenger suites according to a second example embodiment.
Figure 30:
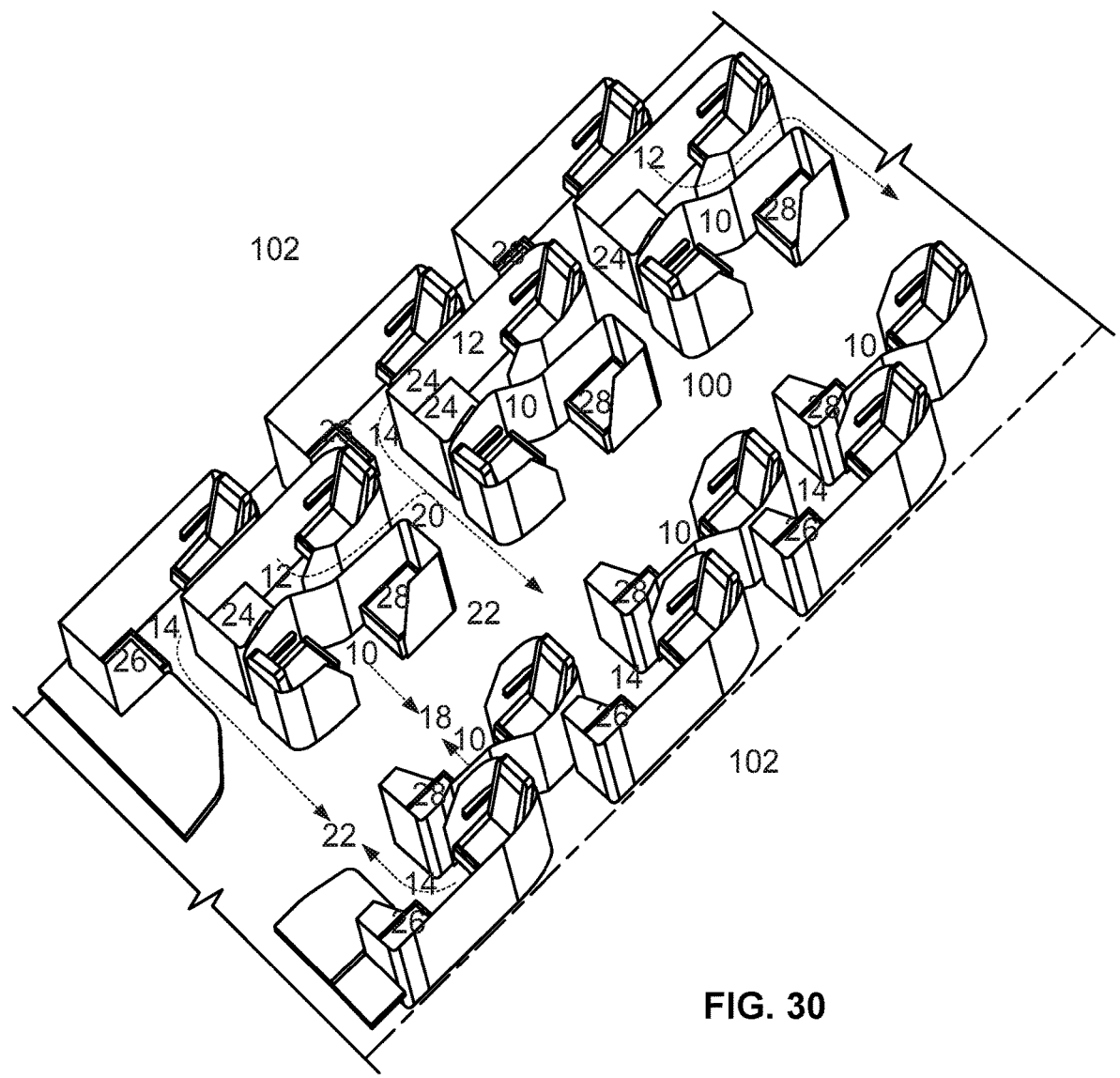
FIG. 30 is a perspective view of the triplet seating arrangement and duet seating arrangement of FIG. 29.

Referring now to FIGS. 29-30, an airplane passenger suite with duet seating arrangements according to one embodiment is illustrated. The duet seating arrangement can include two suites abreast occupying the space between the aisle 100 and the wall 102, an aisle suite 10, and a window suite 14.

Each suite 10, 14 includes a seat 16 therein, the longitudinal axis thereof oriented substantially parallel to the respective suite axis. While only a portion of the seat frame is shown for clarity, it is intended that each seat include at least an adjustable seat back and seat bottom, and more preferably, a seat bottom, seat back and leg rest that adjust to cooperatively form a horizontal bed on coordination with a corresponding ottoman 24, 28 during flight for maximum comfort. As such, a suitable amount of open floor space is provided immediately forward of each seat 16 to accommodate pivoting and/or horizontally translating seating surfaces to allow the seat to adjust from an upright sitting position to a horizontal sleeping position. Each suite 10, 14 can also be equipped with audio/video equipment, deployable tables and other conventional amenities. A video monitor can be positioned directly forward of each seat 16, such as mounted to aisle suite partition, and shared window suite partition.

Each of the aisle suite 10 and the window suite 14 is equipped with its own dedicated entrance to provide unimpeded access to the aisle 100 from the respective suite. Access to the aisle suite 10 is provided through aisle suite entrance 18. Access to the middle suite 12 is provided through middle suite entrance 20. Access to the window suite 14 is provided through window suite entrance 22.

Each duet seating arrangement is designed to maximize a number of suites, suite privacy, and to provide unimpeded access to the aisle 100 by having for each suite an orientation, access entrance and partitions.

In one embodiment, the aisle suite 10 and the window suite 14 are positioned and oriented to allow a greater number of suites to be positioned abreast, to maximize suite privacy, and to provide unimpeded access to the aisle 100 for each suite. The aisle suite 10 can be positioned adjacent the aisle 100, the window suite 14 can be positioned adjacent the wall 102, and adjacent to the aisle suite 10. Each suite of the duet seating arrangement 10, 14 can define a longitudinal suite axis oriented substantially parallel to the longitudinal axis of the aisle 100, which may be oriented parallel to the longitudinal axis of the aircraft.

For example, the aisle suite 10 and the window suite 14 can have a common orientation e.g. forward, and be longitudinally offset from each other as illustrated in FIGS. 29-30.

In one configuration, the aisle suite entrance 18 and the window suite entrance 22 have spatial configurations to allow a greater number of suites to be positioned abreast, to maximize suite privacy, and to provide unimpeded access to the aisle 100 for each suite.

For example, the aisle suite entrance 18 can be directly adjacent the aisle 100, as illustrated in FIGS. 29-30, while the middle suite entrance 20 can be spaced from the aisle 100 at a distance about a width of aisle suite 10, as illustrated in FIGS. 29-30.

In one embodiment, partitions can serve to define the boundaries of the suites, offer a degree of privacy, and support amenities such as video monitors. For example, the window suite entrance 22 can be between the aisle suite partition and the window suite partition, as illustrated in FIGS. 29-30. Partitions can have any vertical height, but preferably extend to a height of about 120 cm to about 180 cm.

In one configuration, several duet seating arrangements can be grouped together to form suite clusters. For example, suite clusters can be formed by placing substantially identical duet seating arrangements 10, 14 through a translational symmetry following an imaginary axis of translation substantially parallel to the aisle 100 and/or the wall 102, as illustrated in FIGS. 29, 30.

Referring now to FIGS. 35-39, airline passenger seating groups with quintuplet seating arrangements according to several embodiments are illustrated. The quintuplet seating arrangements can include five suites occupying the space between the aisle 100 and the wall 102, an aisle suite 10, a window suite 14, a middle suite 12, a fore suite 510 and an aft suite 512.

Each suite 10, 12, 14, 510, 512 can include a seat 16, each seat 16 can include at least an adjustable seat back and seat bottom, and more preferably, a seat bottom, seat back and leg rest that adjust to cooperatively form a horizontal bed in cooperation with a corresponding ottoman 28, 24, 26, 528, and 524 during flight for maximum comfort. As such, a suitable amount of open floor space is provided immediately forward of each seat 16 to accommodate pivoting and/or horizontally translating seating surfaces to allow the seat to adjust from an upright sitting position to a horizontal sleeping position. Each suite 10, 12, 14, 510, 512 can also be equipped with audio/video equipment, deployable tables and other conventional amenities that can be mounted to aisle suite, partition, middle suite partition, shared window suite partition, a fore suite partition, and an aft suite partition.

Each suite 10, 12, 14, 510, and 512 is equipped with their own dedicated entrance to provide unimpeded access to the aisle 100 from the respective suite. Accesses to the aisle suite 10, the middle suite 12, the window suite 14, the fore suite 510, the aft suite 520 are provided through an aisle suite entrance 18, a middle suite entrance 20 and a window suite entrance 22, a fore suite entrance 518, and an aft suite entrance 522, respectively.

Each quintuplet seating arrangement is designed to maximize a number of suites, suite privacy, and to provide unimpeded access to the aisle 100 by having for each suite an orientation, access entrance and partitions.

In some embodiments, the aisle suite 10, the middle suite 12, the window suite 14, the fore suite 510, and the aft suite 512 are positioned and oriented to allow a greater number of suites to be positioned, to maximize suite privacy, and to provide unimpeded access to the aisle 100 for each suite.

Figure 35:
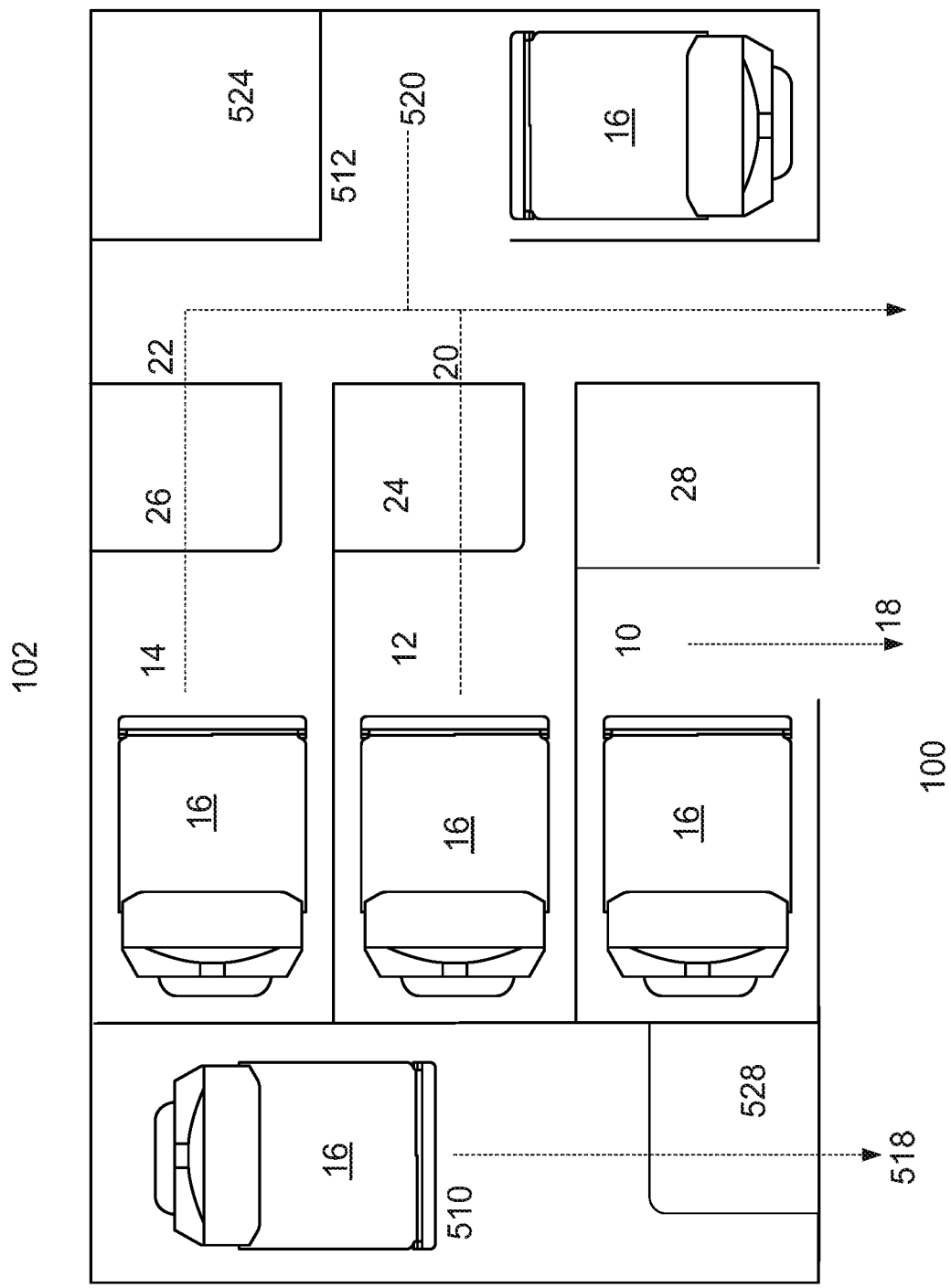
FIG. 35 is a top view of a quintuplet seating arrangement for aircraft passenger suites according to a first example embodiment.
Figure 36:
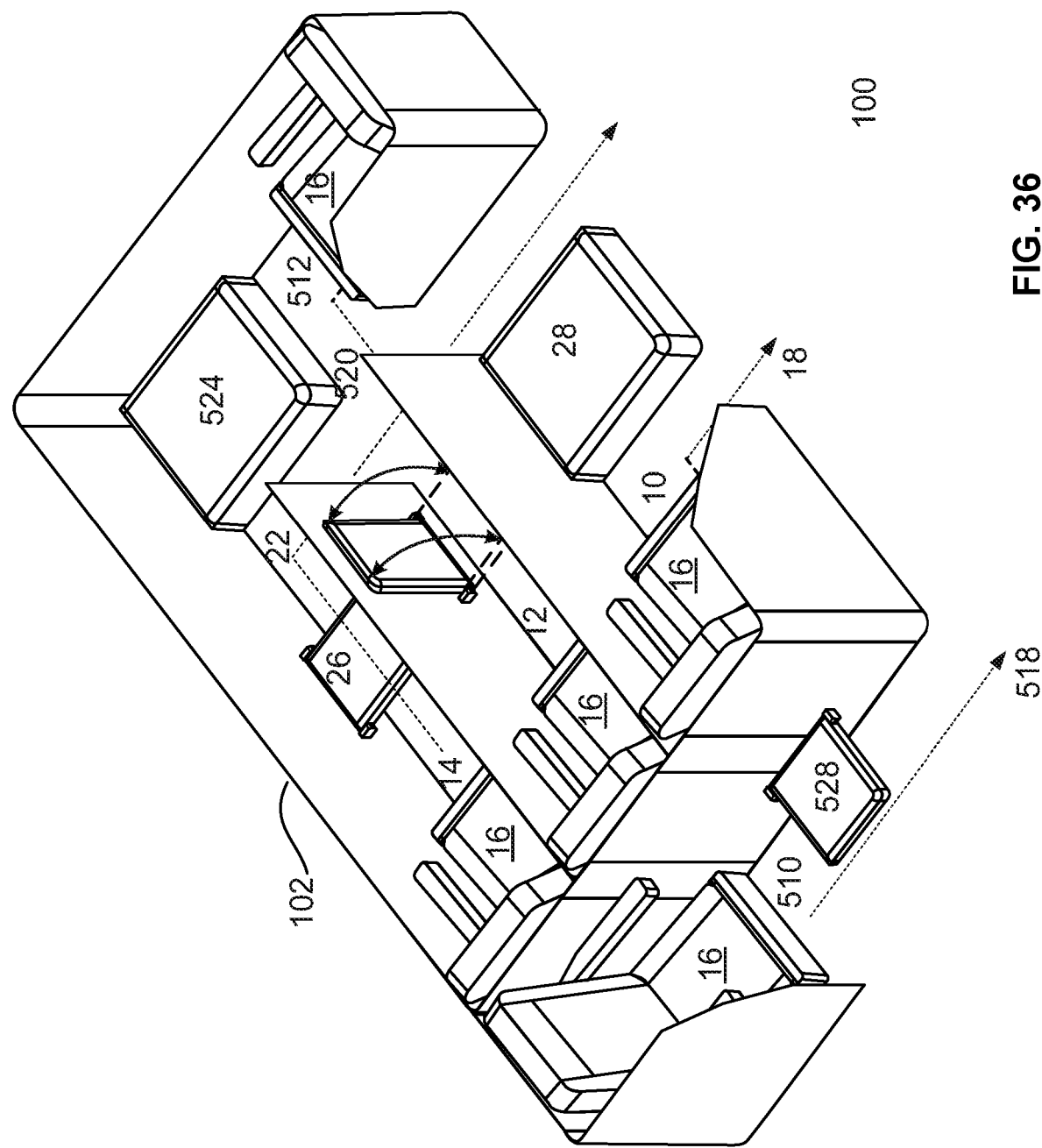
FIG. 36 is a perspective view of the quintuplet seating arrangement of FIG. 35.

For example, one quintuplet seating arrangement can have the aisle suite 10 positioned directly adjacent the aisle 100, the window suite 14 positioned longitudinally adjacent to the wall 102, the middle suite 12 positioned between the aisle suite 10 and the window suite 14, the aft suite place 512 positioned laterally aftward from the suites 10, 12, 14 and a fore suite 510 positioned laterally forward from the suites 10, 12, 14 as illustrated in FIGS. 35, 36.

Figure 37:
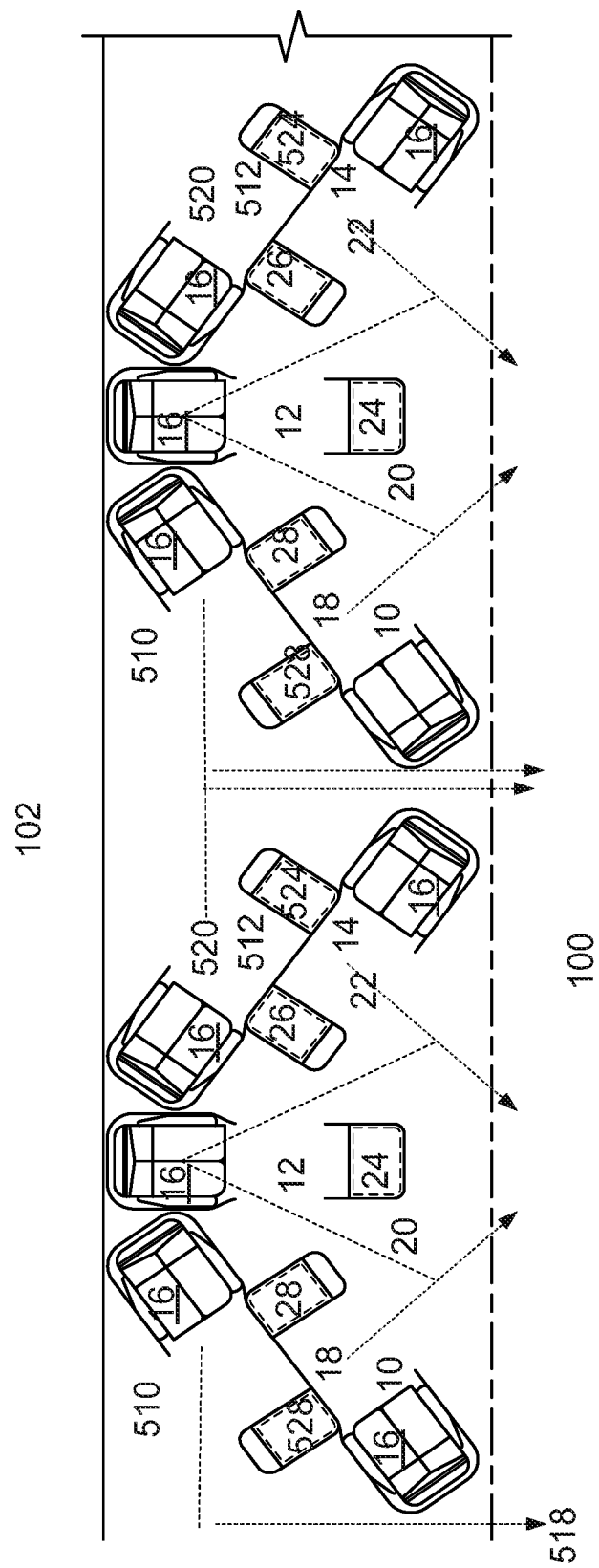
FIG. 37 is a top view of a quintuplet seating arrangement for aircraft passenger suites according to a second example embodiment.
Figure 38:
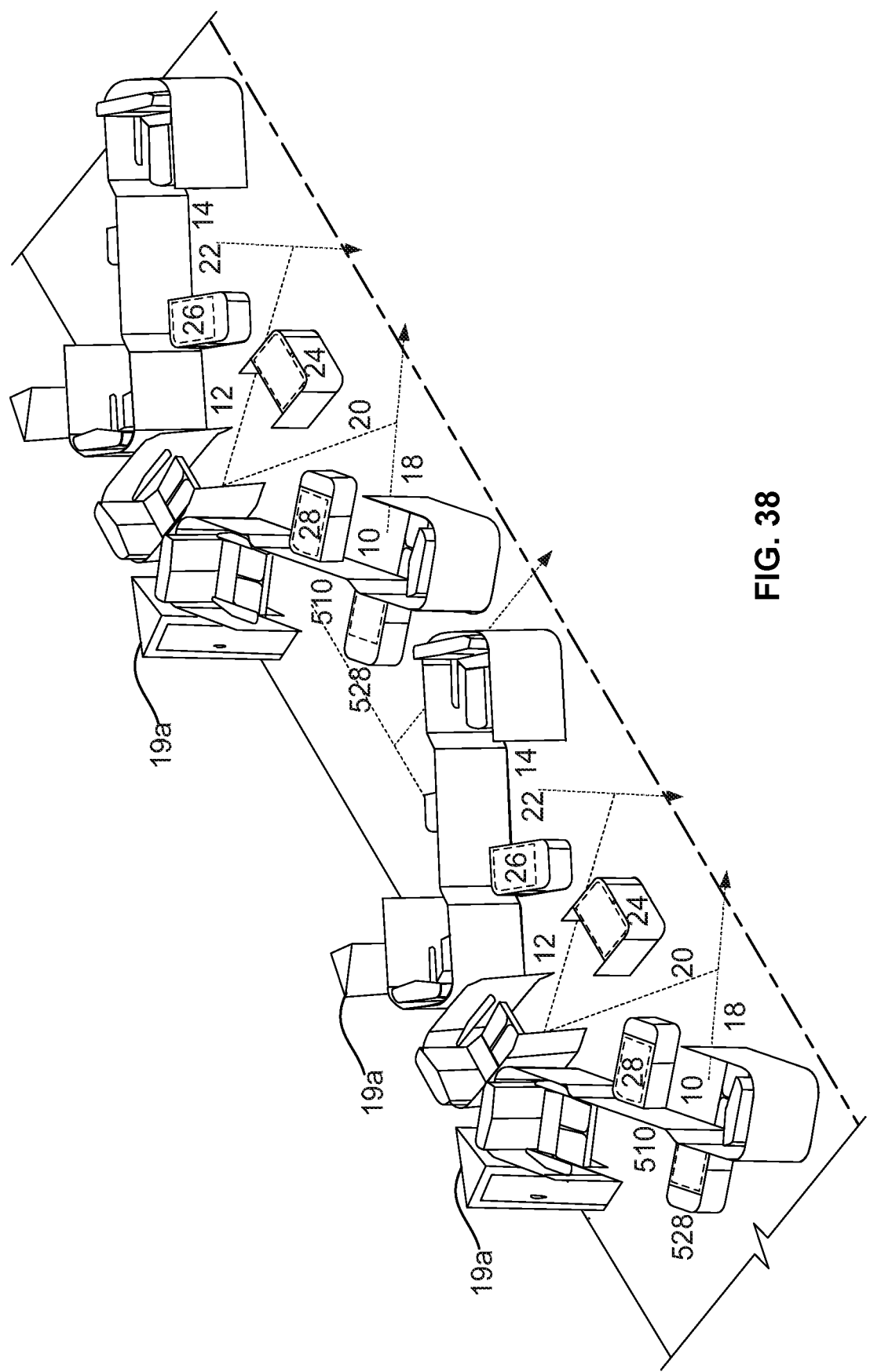
FIG. 38 is a perspective view of the quintuplet seating arrangements of FIG. 37.
Figure 39:
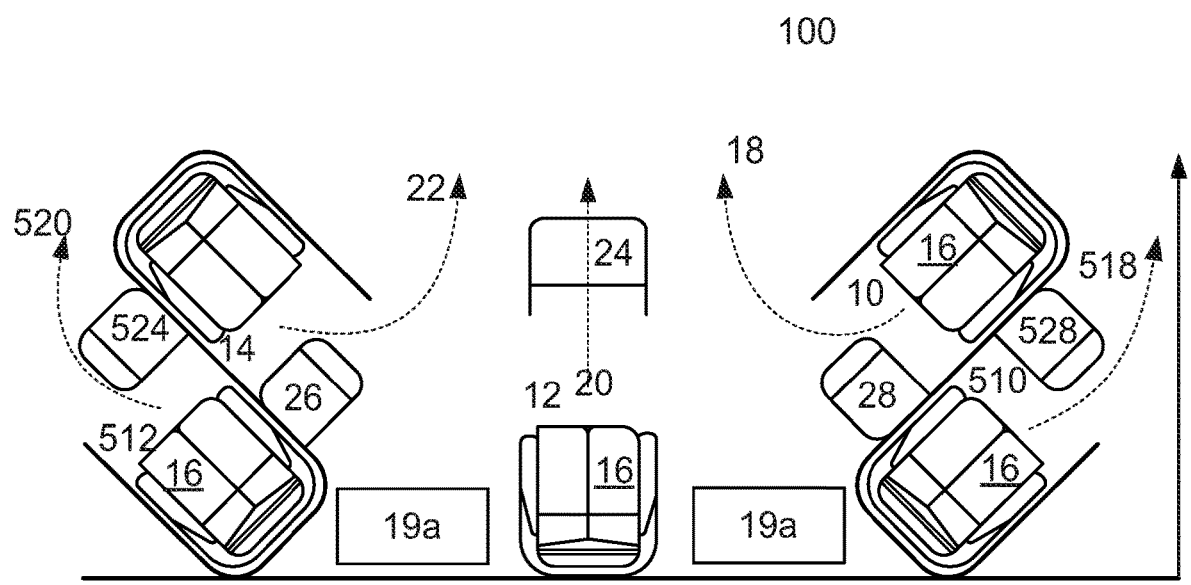
FIG. 39 is a top view of a quintuplet seating arrangement for aircraft passenger suites according to a third example embodiment.

In another example, one quadruplet seating arrangement can have the middle suite 12 positioned laterally adjacent to the aisle 100, the aisle suite 10 and the window suite 14 positioned obliquely adjacent to the aisle 100, the fore suite 510 can be adjacent to the aisle suite 10, and the aft suite 512 can be adjacent to the window suite 14, as illustrated in FIGS. 37-38.

In some configurations, the aisle suite entrance 18, the middle suite entrance 20, the window suite entrance 22, the fore suite entrance 518, and the aft suite entrance 520 have spatial configurations to allow a greater number of suites to be positioned, to maximize suite privacy, and to provide unimpeded access to the aisle 100 for each suite.

For example, the aisle suite entrance 18 and the fore suite entrance 518 can be directly adjacent the aisle 100, the middle suite entrance 20 and the aft suite entrance 520 can be spaced from the aisle 100 at a distance about a width of aisle suite 10, and the window suite entrance 22 can be spaced from the aisle 100 at a distance about a combined widths of aisle suite 10 and middle suite 12, as illustrated in FIGS. 35-36.

In another example, the aisle suite entrance 18 and the window suite entrance 20 can be spaced from the aisle 100 at a distance about a width of the aisle suite 10 and the window suite 14, the middle suite entrance 20 can be spaced from the aisle 100 at a distance about the length of the middle suite 12, and the fore suite entrance 518 and the aft suite entrance 520 can be spaced from the aisle 100 at a distance about a width of the aisle suite 10 and the window suite 14, as illustrated in FIGS. 37-38.

In some embodiments, partitions 24, 26, 28, 528, 524 can serve to define the boundaries of the suites, offer a degree of privacy, open or close the access to the suites by having deployable elements, e.g., the ottoman, the table, articulated between a folded and a deployed position.

For example, the aisle suite entrance 18 can be between the ottoman 28 and the seat 16, the middle suite entrance 20 can be through the ottoman 24 in folded position, the window suite entrance 22 can be through the ottoman 26 in folded position, the fore suite entrance 518 can be between the seat 16 and the ottoman 528 (or through the ottoman 528 in stowed position), and the aft suite entrance 520 can be along the ottomans 28, 24 and between the ottoman 524 and the seat 16 (or through the position of ottoman 524 with ottoman 524 in stowed position), as illustrated in FIGS. 35-36.

In another example, the aisle suite entrance 18 can be between the partition 22 and the seat 16, the window suite entrance 14 can be between the partition 26 and the seat 16, the middle suite entrance 20 can be around the partition 24, the fore suite entrance can be around the seat 16 of the aisle suite 10 and between the partition 52$ and the seat 16, and the aft suite entrance 512 can be around the seat 16 of the window suite 14 and between the partition 524 and the seat 16, as illustrated in FIGS. 37-38.

Referring now to FIGS. 31-34, sextuplet seating arrangements for airline passenger suites according to several embodiments are illustrated. The sextuplet seating arrangements can include six suites occupying the space between the aisle 100 and the wall 102, a first window suite 14a, a second window suite 14b, a middle suite 12, a fore suite 610 and an aft suite place 614.

Each suite 10, 12, 14a, 14b, 610, 612 can include a seat 16, each seat 16 can include at least an adjustable seat back and seat bottom, and more preferably, a seat bottom, seat back and leg rest that adjust to cooperatively form a horizontal bed with an ottoman during flight for maximum comfort. As such, a suitable amount of open floor space is provided immediately forward of each seat 16 between each seat 16 and a corresponding ottoman to accommodate pivoting and/or horizontally translating seating surfaces to allow the seat to adjust from an upright sitting position to a horizontal sleeping position. Each suite 10, 12, 14a, 14b, 610, 612 can also be equipped with audio/video equipment, deployable tables and other conventional amenities that can be mounted to aisle suite partition, middle suite partition, shared window suite partition, a fore suite partition, and an aft suite partition.

Each suite 10, 12, 14a, 14b, 610, and 612 is equipped with its own dedicated entrance to provide unimpeded access to the aisle 100 from the respective suite. Accesses to the aisle suite 10, the middle suite 12, the first window suite 14a, the second window suite 14b, the fore suite 610, the aft suite are provided through an aisle suite entrance 18, a middle suite entrance 20 and a first window suite entrance 22a, a second window suite 22b, a fore suite entrance 618, and an aft suite entrance 620, respectively.

Each sextuplet seating arrangement is designed to maximize a number of suites, suite privacy, and to provide unimpeded access to the aisle 100 by having for each suite an orientation, access entrance and partitions.

In some embodiments, the aisle suite 10, the middle suite 12, the first window suite 14a, the second window suite 14b, the fore suite 610, and the aft suite 612 are positioned and oriented to allow a greater number of suites to be positioned, to maximize suite privacy, and to provide unimpeded access to the aisle 100 for each suite.

Figure 31:
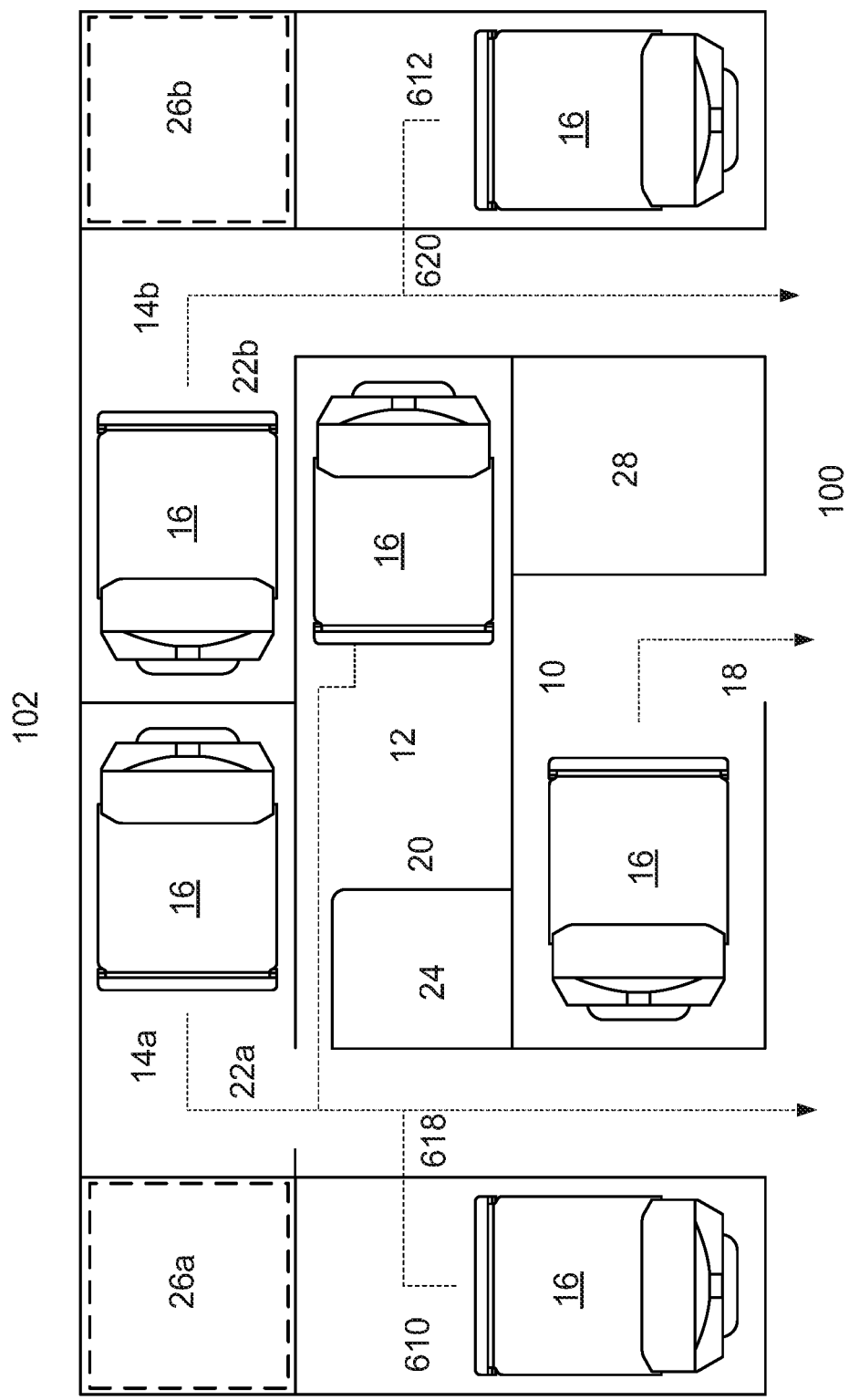
FIG. 31 is a top view of a sextuplet seating arrangement for aircraft passenger suites according to a first example embodiment.
Figure 32:
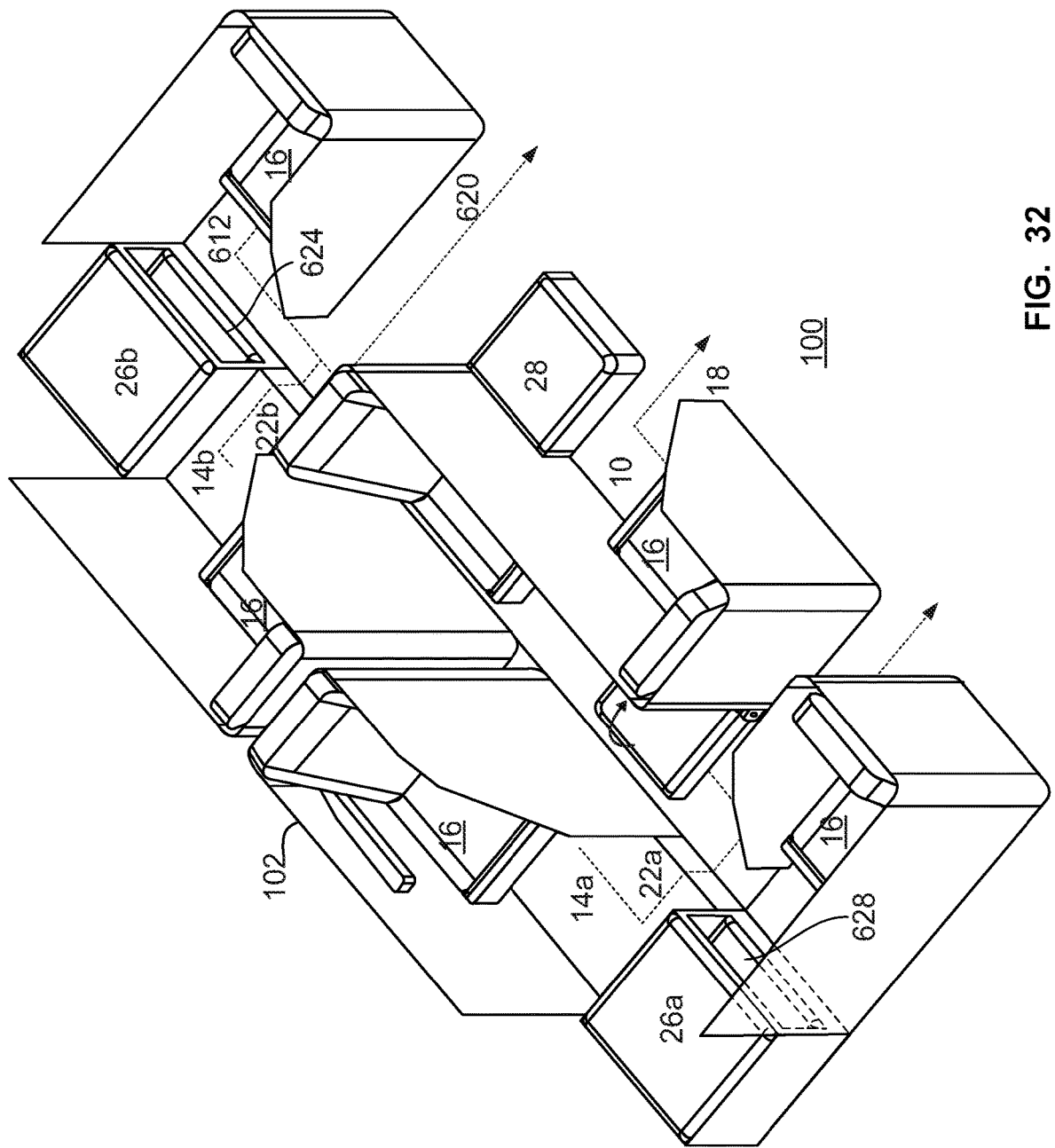
FIG. 32 is a perspective view of the sextuplet seating arrangements of FIG. 31.
Figure 33:
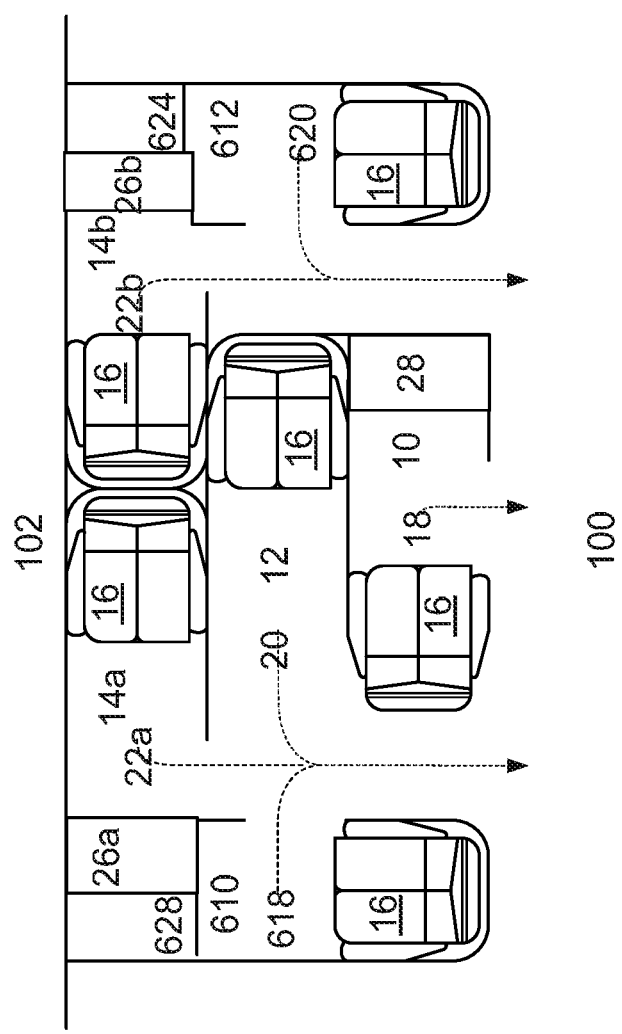
FIG. 33 is a top view of a sextuplet seating arrangement for aircraft passenger suites according to a second example embodiment.

For example, one sextuplet seating arrangement can have the aisle suite 10 positioned longitudinally adjacent to the aisle 100, the first and the second window suites 14a, 14b positioned longitudinally adjacent to the wall 102, the middle suite 12 positioned between the aisle suite 10 and the first and second window suites 14a, 14b, the aft suite place 614 positioned laterally aftward from the suites 10, 12, 14a, 14b and a fore suite 610 positioned laterally forward from the suites 10, 12, 14a, 14b as illustrated in FIGS. 31, 32, 33. The first window suite 14a and the second window suite 14b can be positioned back-to-back and longitudinally extend over the middle suite 12 by about half of a length of the first window suite 14a in a forward direction and by about half of a length of the second window suite 14b in an aftward direction.

Figure 34:
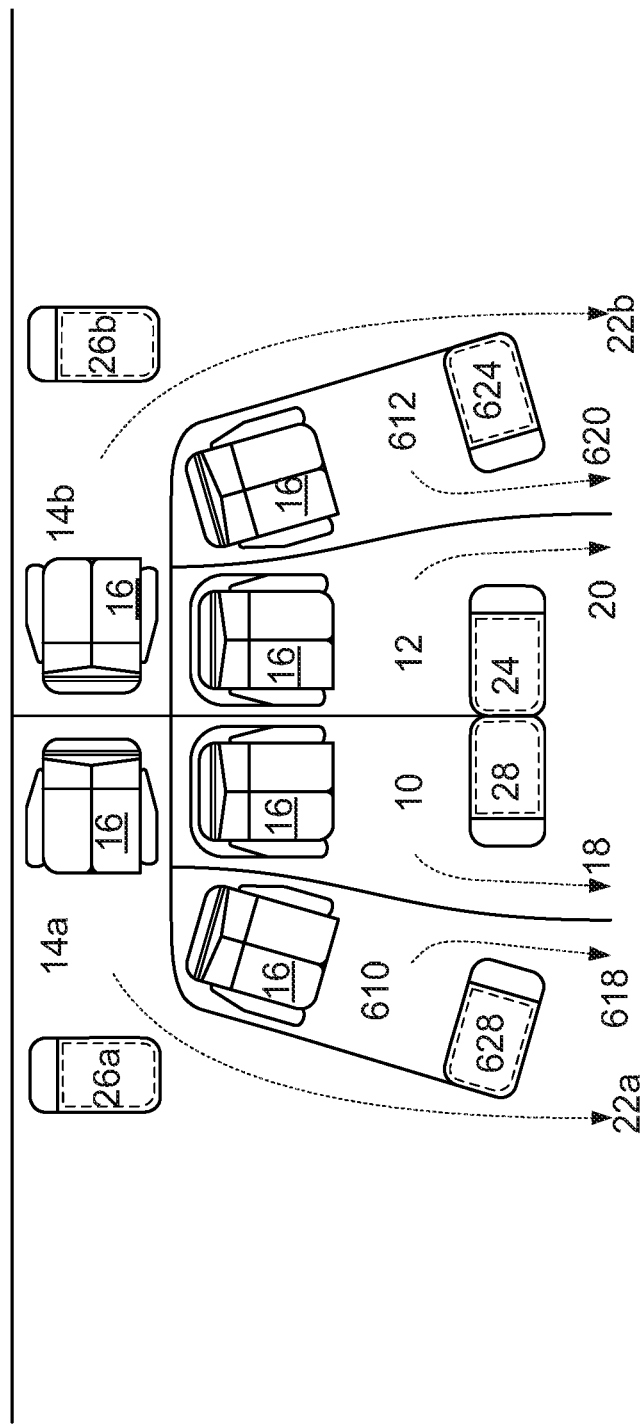
FIG. 34 is a top view of a sextuplet seating arrangement for aircraft passenger suites according to a third example embodiment.

In another example, one sextuplet seating arrangement can have the aisle suite 10 and the middle suite 12 positioned perpendicularly adjacent to the aisle 100, the aft suite 610 and the fore suite 612 positioned obliquely adjacent to the aisle, and the first and the second window suites 14a, 14b positioned longitudinally adjacent to the wall 102, as illustrated in FIG. 34.

In some configurations, the aisle suite entrance 18, the middle suite entrance 20, the first window suite entrance 22a, the second window suite entrance 22b, the fore suite entrance 620, and the aft suite entrance 620 have spatial configurations to allow a greater number of suites to be positioned, to maximize suite privacy, and to provide unimpeded access to the aisle 100 for each suite.

For example, the aisle suite entrance 18 can be directly adjacent the aisle 100, the middle suite entrance 20 can be spaced from the aisle 100 at a distance about a width of aisle suite 10, the fore suite entrance 618 and the aft suite entrance 620 can be spaced from the aisle 100 at a distance about a half of a length of the fore suite 610 and the aft suite 612, and the first window suite entrance 22a and the second window suite entrance 22b can be spaced from the aisle 100 at a distance about a combined widths of aisle suite 10 and middle suite 12, as illustrated in FIGS. 31-33.

In another example, the aisle suite entrance 18, the middle suite entrance 20, the fore suite entrance 618, and the aft suite entrance 620 can be directly adjacent the aisle 100, while first window suite entrance 22a and the second window suite entrance 22b can be spaced from the aisle 100 at a distance about a length of aisle suite 10, as illustrated in FIG. 34.

In some embodiments, partitions can serve to define the boundaries of the suites, offer a degree of privacy, open or close the access to the suites by having deployable elements, e.g., the ottoman, the table, articulated between an open and a closed position.

For example, the aisle suite entrance 18 can be between the ottoman 28 and the seat 16, the middle suite entrance 28 can be around and/or through the ottoman 24 in folded position, the first window suite entrance 22a can be between the ottoman 26a and the fore suite 610, the second window suite entrance 22b can be between the ottoman 28 and the aft suite 612, and between the ottoman 26b and the seat 16, the fore suite entrance 618 can be between the ottoman 26a and the seat 16, and the aft suite entrance 620 can be between the ottoman 26b and the seat 16, as illustrated in FIGS. 31-33.

In another example, the aisle suite entrance 18 can be around and/or through the ottoman 28 in a raised position, the middle suite entrance 20 can be around and/or through the ottoman 24 in a raised position, the fore suite entrance 618 can be around and/or through the ottoman 628 in a raised position, the aft suite entrance 620 can be around and/or through the ottoman 624 in a raised position, the first window suite entrance 22a can be around the ottoman 628 and between the ottoman 26a and the seat 16, and the second window suite entrance 22b can be around the ottoman 624 and between the ottoman 26b and the seat 16, as illustrated in FIG. 34.

Figure 5:
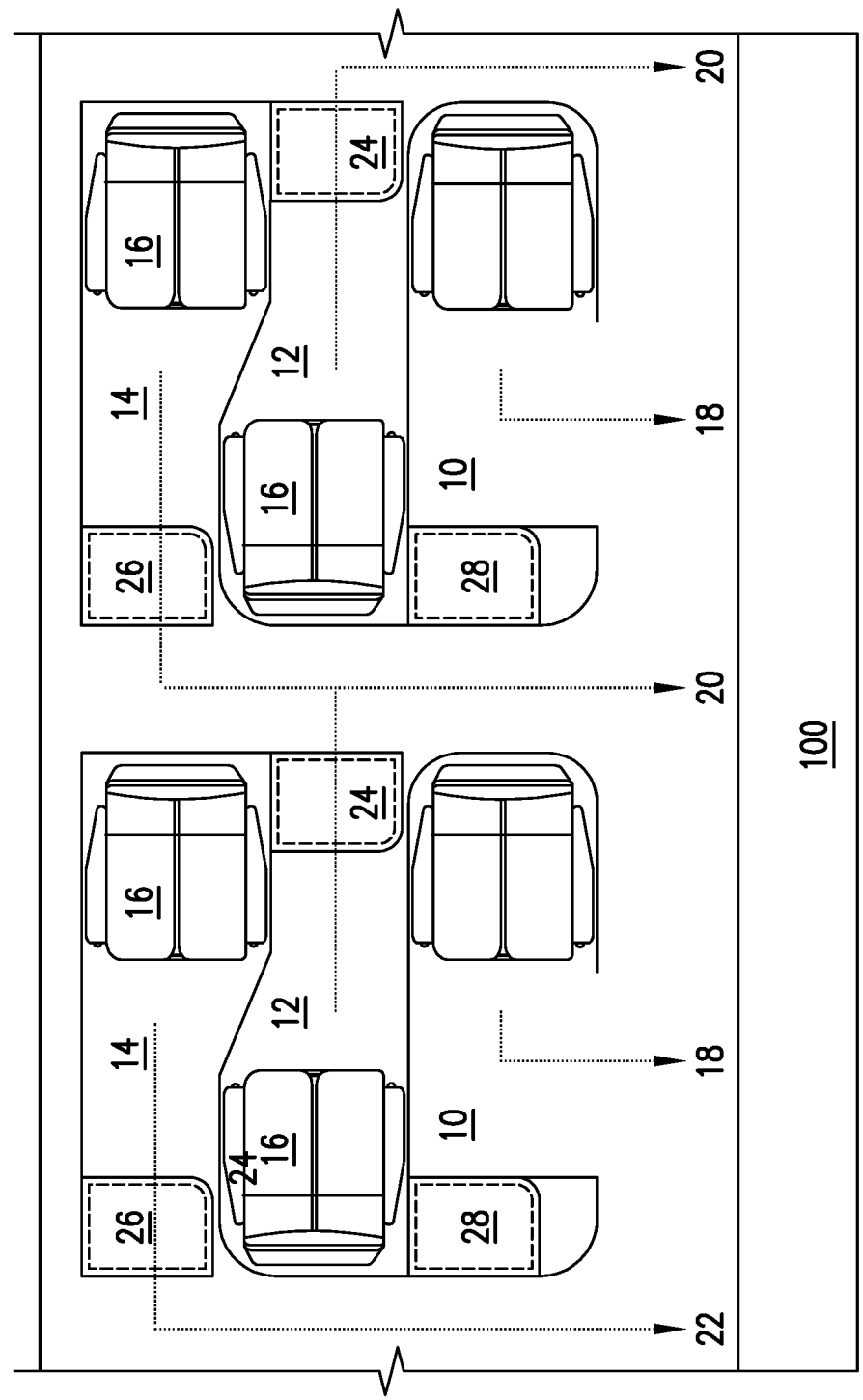
FIG. 5 is a top view of a triplet seating arrangement for aircraft passenger suites according to a third example embodiment.
Figure 6:
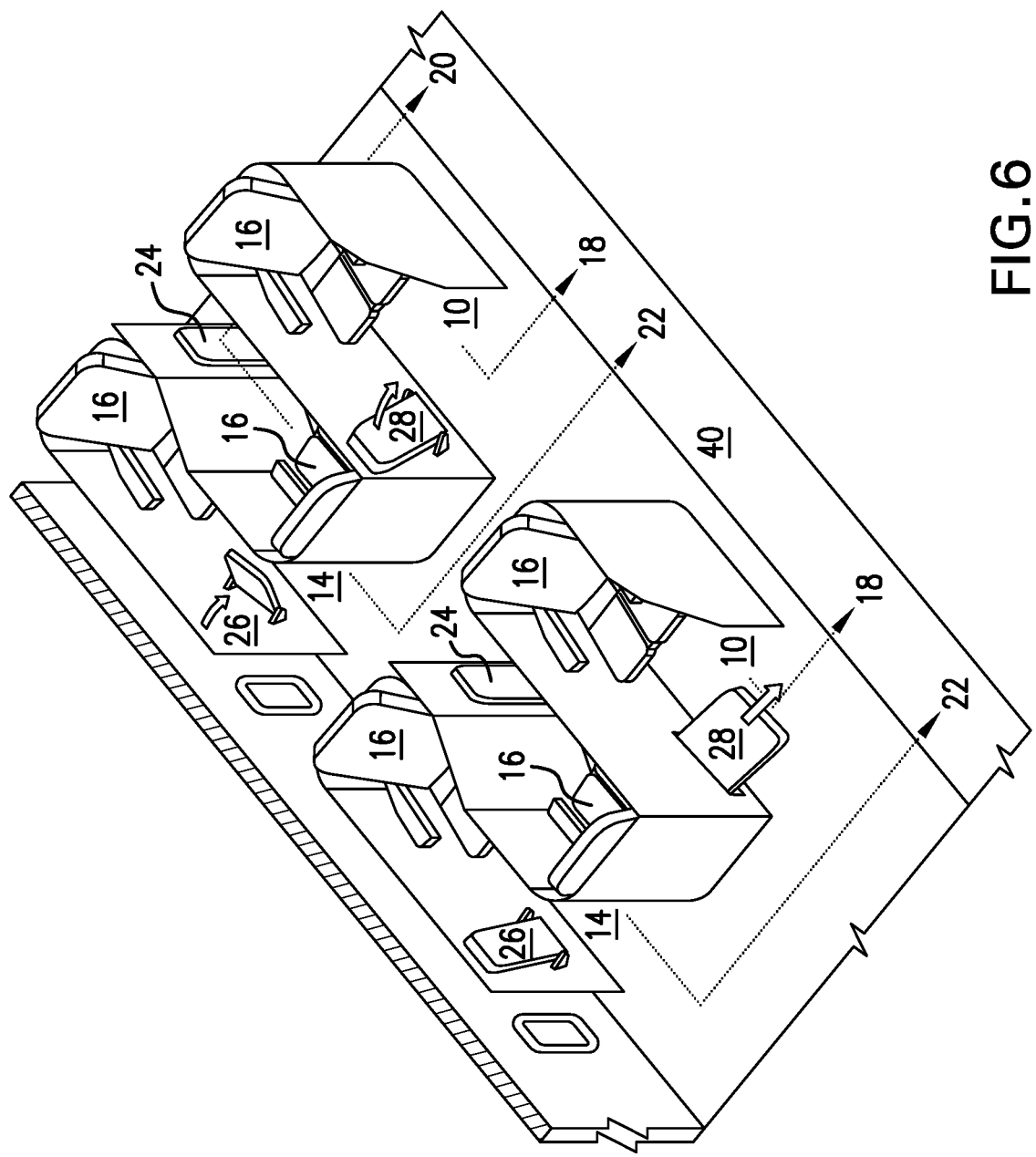
FIG. 6 is a perspective view of the triplet seating arrangement of FIG. 5.
Figure 7:
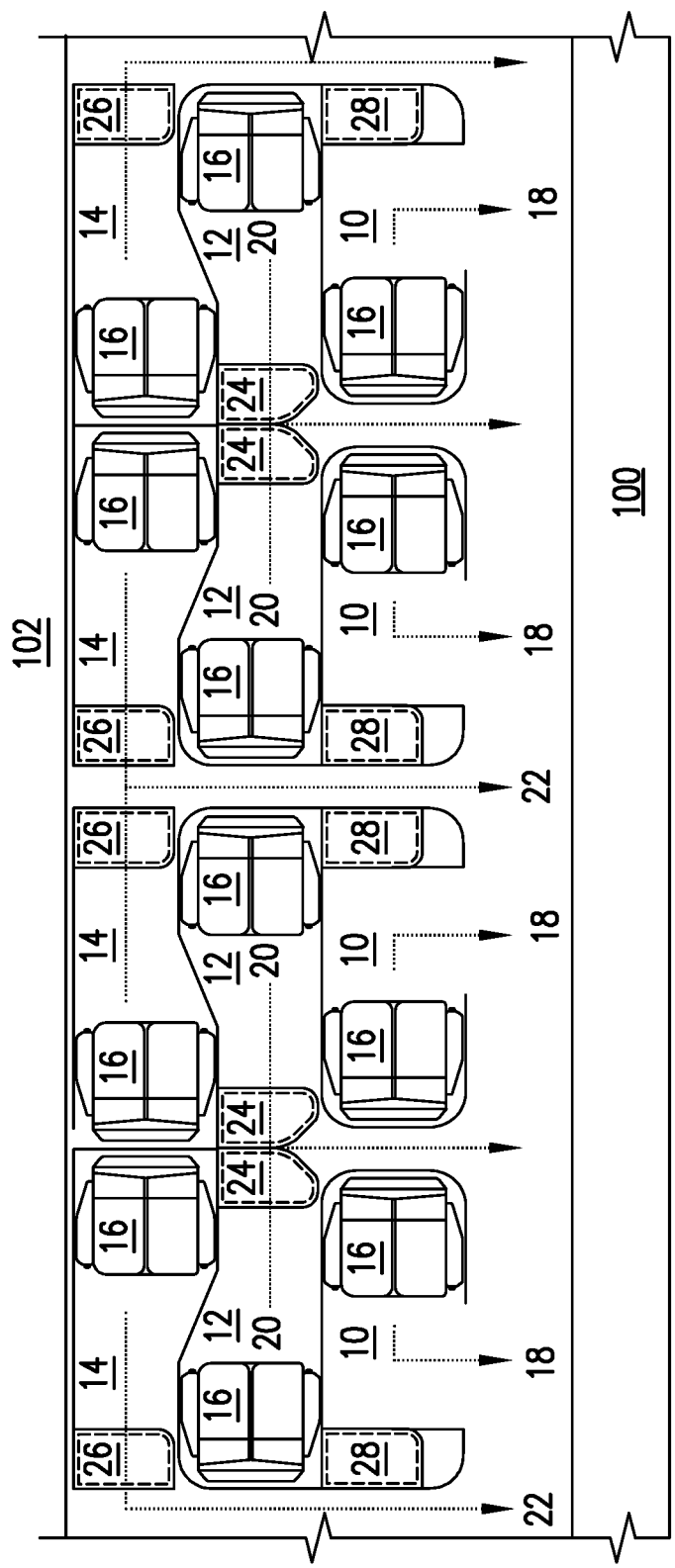
FIG. 7 is a top view of a sextet seating arrangement for aircraft passenger suites according to an example embodiment.
Figure 8:
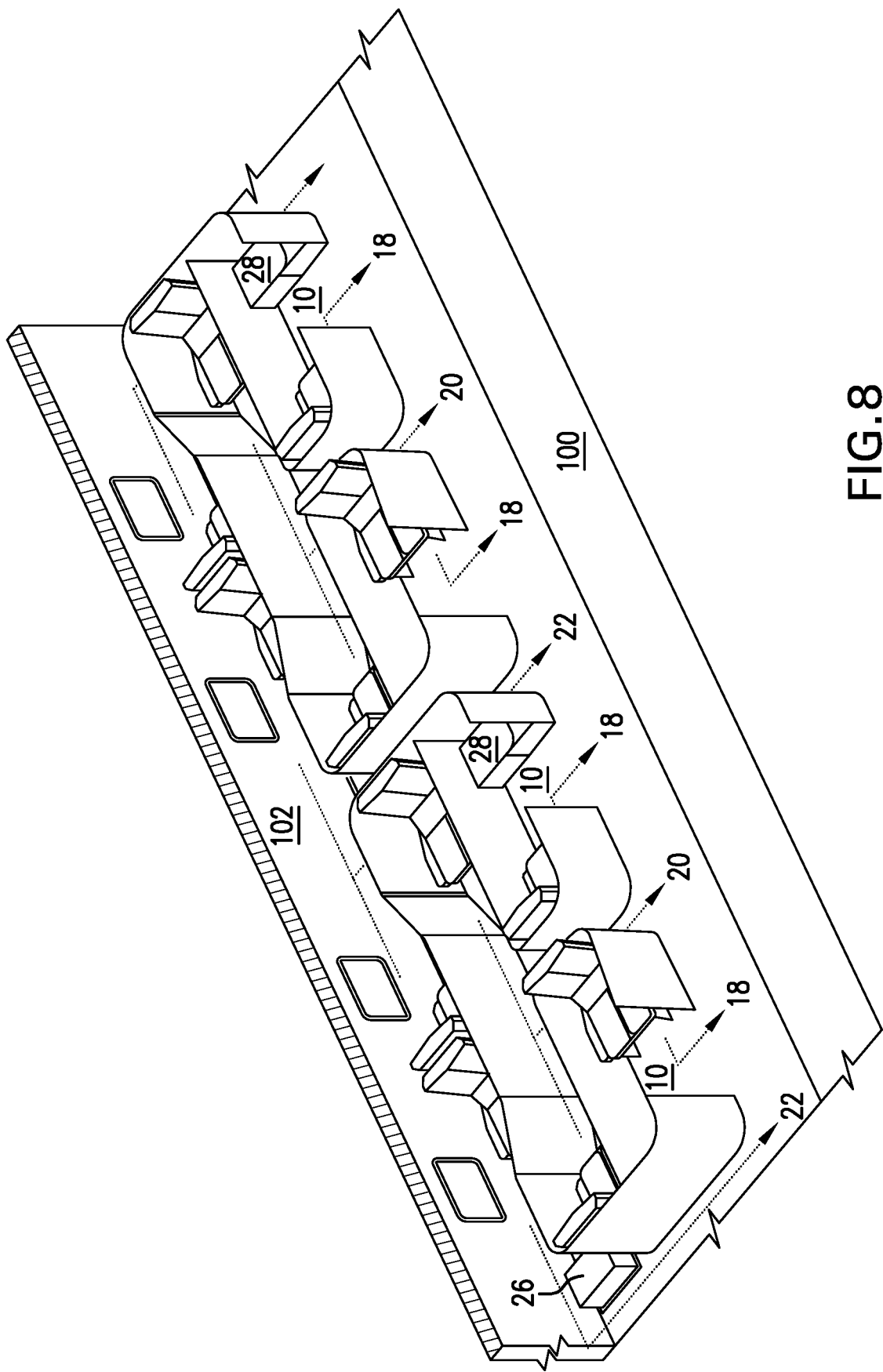
FIG. 8 is a perspective view of the sextet seating arrangement of FIG. 7.

In some embodiments, some ottomans 24, 26, 28 for the triplet seating arrangements, some ottomans 24, 26, 28, 524, 528 for the quintuplet seating arrangements, or some ottomans 24, 26a, 26b, 28, 624, 628 for the sextuplet seating arrangements can be an articulable ottoman that can be articulated by the passengers between a deployed position and an undeployed position. In the undeployed position, the articulable ottoman can provide a passage; while in the deployed position, the articulable ottoman can provide a foot rest or completion of a lie-flat bed for the passenger and may impede the access of a passenger exiting the seat 16. The articulable ottoman can be a flip up ottoman rotatably affixed to a wall of the suite 10, 12, or 14 and articulable between the undeployed position to the deployed position via a rotation, as illustrated in FIGS. 3-4, and 10-11, or a pull-out foot rest retractably affixed to a wall of the suite 10, 12, or 14 and articulable between the undeployed position and the deployed position by a translation, as illustrated in FIGS. 5-6 for the suite 10 of the triplet seating arrangements and in FIGS. 35-36 for the suite 510 of the quintuplet seating arrangements.

In other examples, the ottoman can be a fixed ottoman, as illustrated in FIGS. 31-32.

In some embodiments, the fixed ottoman can be an over under foot rest that has two foot rest surfaces placed on top of each other to provide support to two different passengers, as illustrated in FIGS. 31-32 for the suites 14a, 610, 628, and 26a of the sextuplet seating arrangements.

Depending on configurations between the seats 16, some suites may require the articulation of the articulable ottoman to provide access to the aisle while others may not require the articulation of the articulable ottoman and the articulable ottoman may be replaced by the fixed ottoman.

Figure 4:
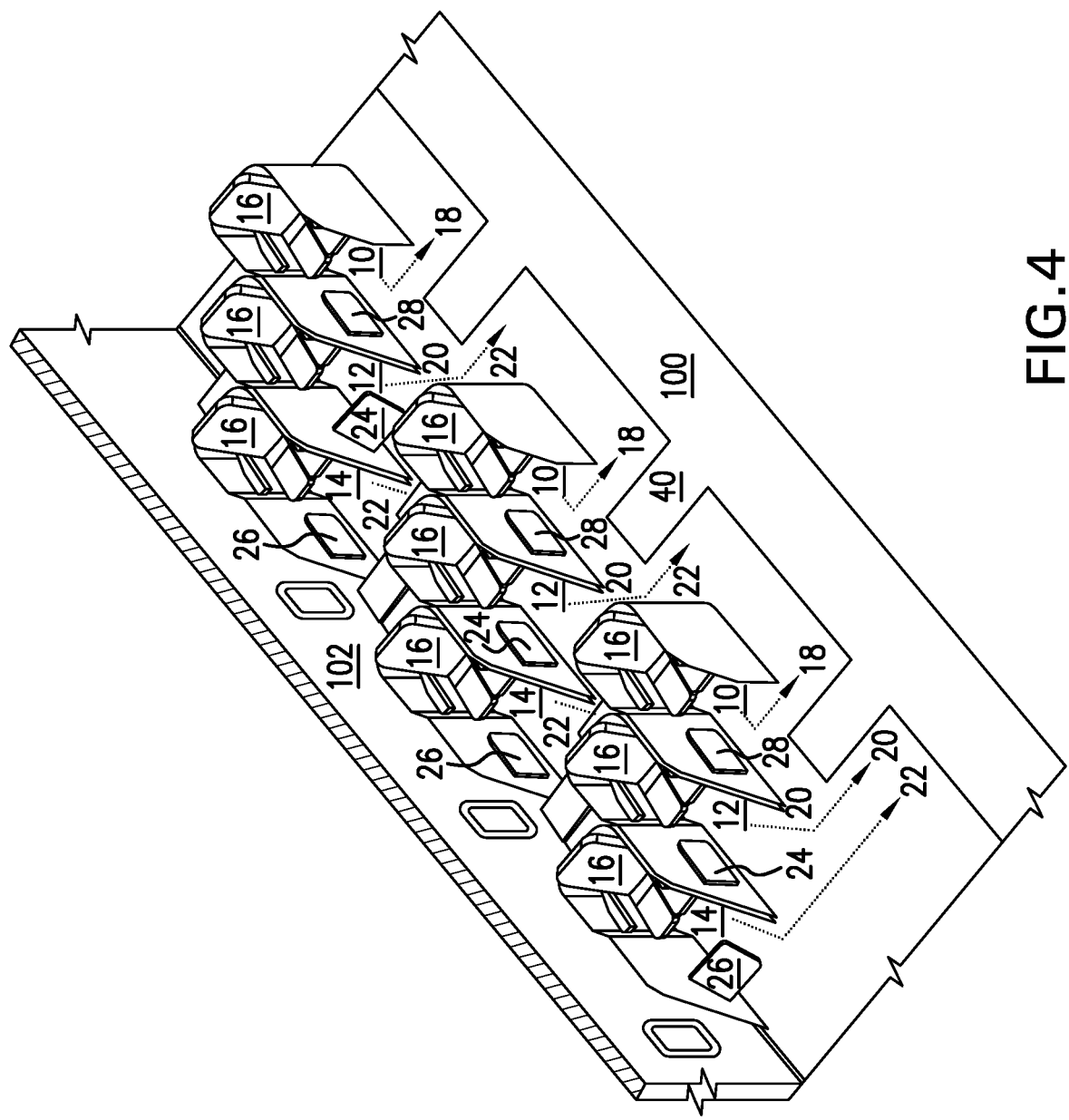
FIG. 4 is a perspective view of the triplet seating arrangement of FIG. 3.

For example, each access to each suite 10, 12, and 14 may be impeded by the articulable ottoman in the deployed position and each suite 10, 12, and 14 may require the articulation of the articulable ottoman from the deployed position to the undeployed position to access to the seat 16, as illustrated in FIG. 4.

In another example, the suite 10 may not be impeded by the articulable ottoman and may not require the articulation of the articulable ottoman to provide access to the seat 16 and the articulable ottoman may be replaced by the fixed ottoman, while the suites 12 and 14 may be impeded by the articulable ottomans in the deployed position and may require the articulation of the articulable ottomans from the deployed position to the undeployed position to provide access to the seat 16, as illustrated in FIGS. 5-6 and 10-11.

Figure 13:
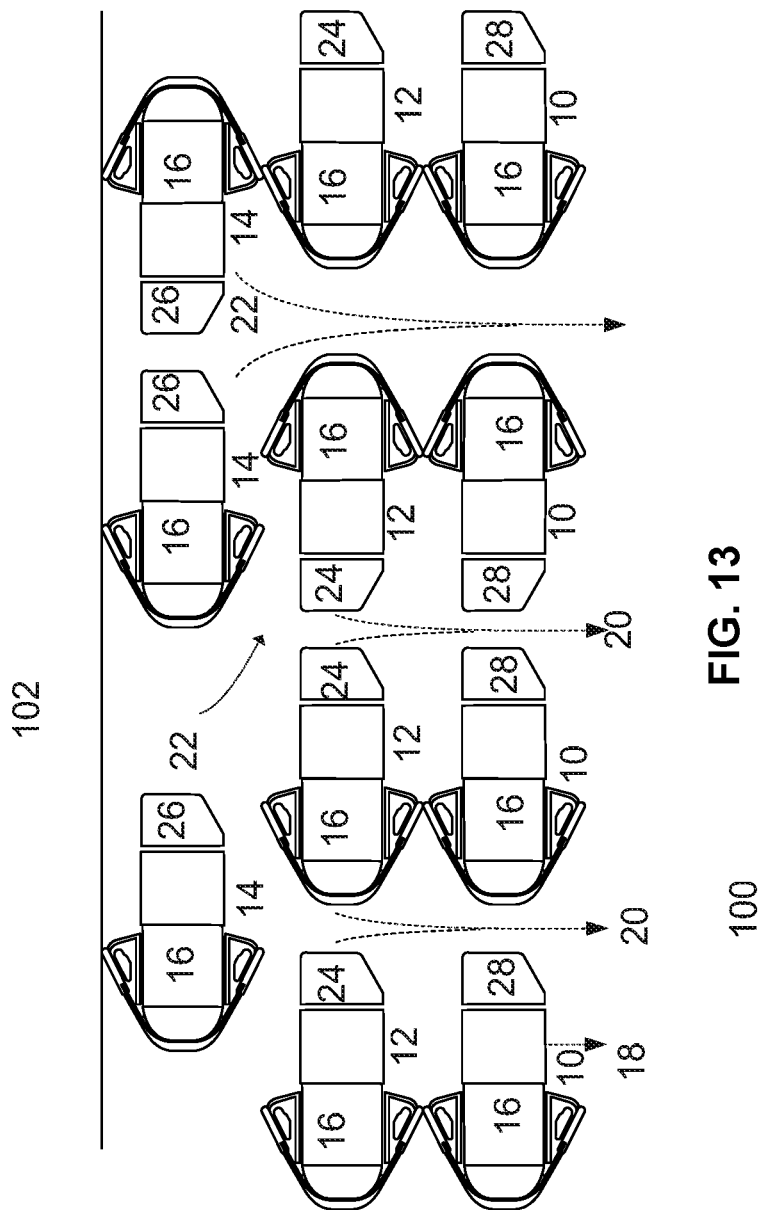
FIG. 13 is a top view of a triplet seating arrangement for aircraft passenger suites according to a seventh example embodiment.
Figure 14:
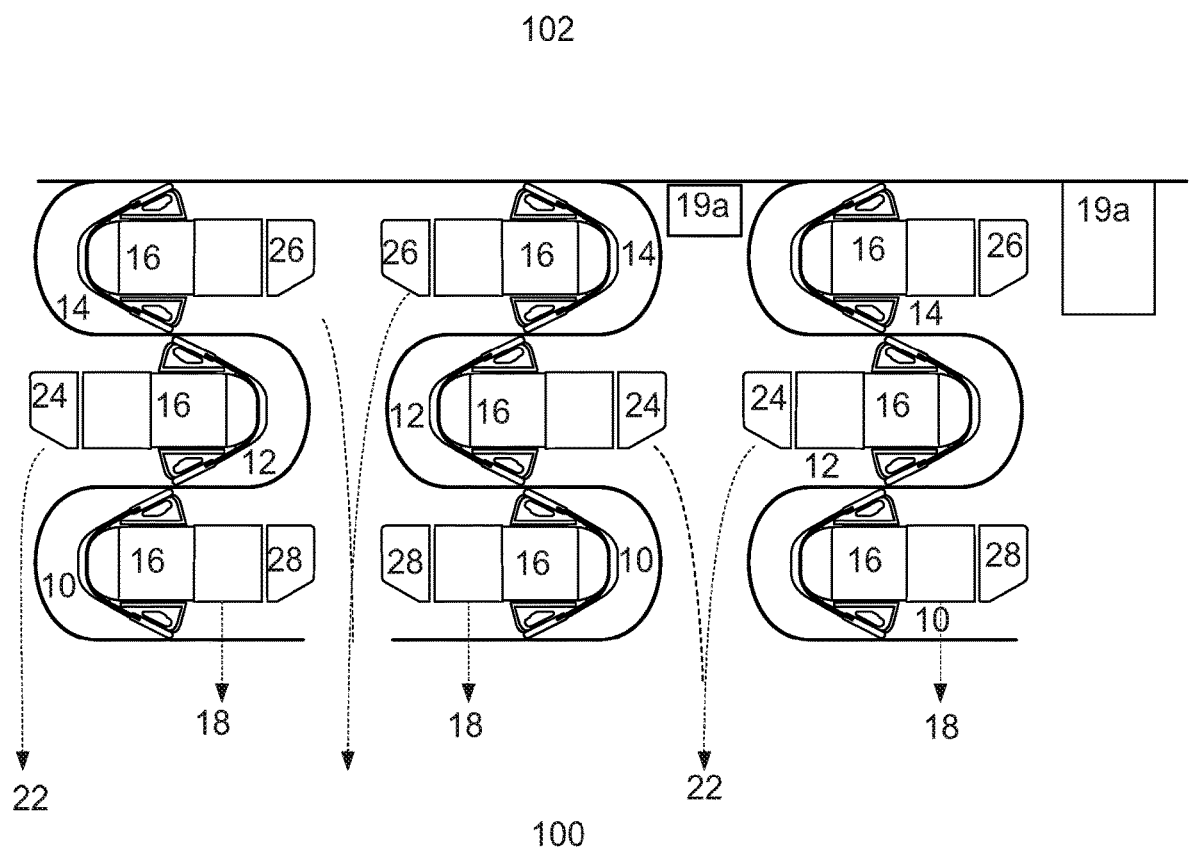
FIG. 14 is a top view of a triplet seating arrangement for aircraft passenger suites according to an eighth example embodiment.
Figure 15:
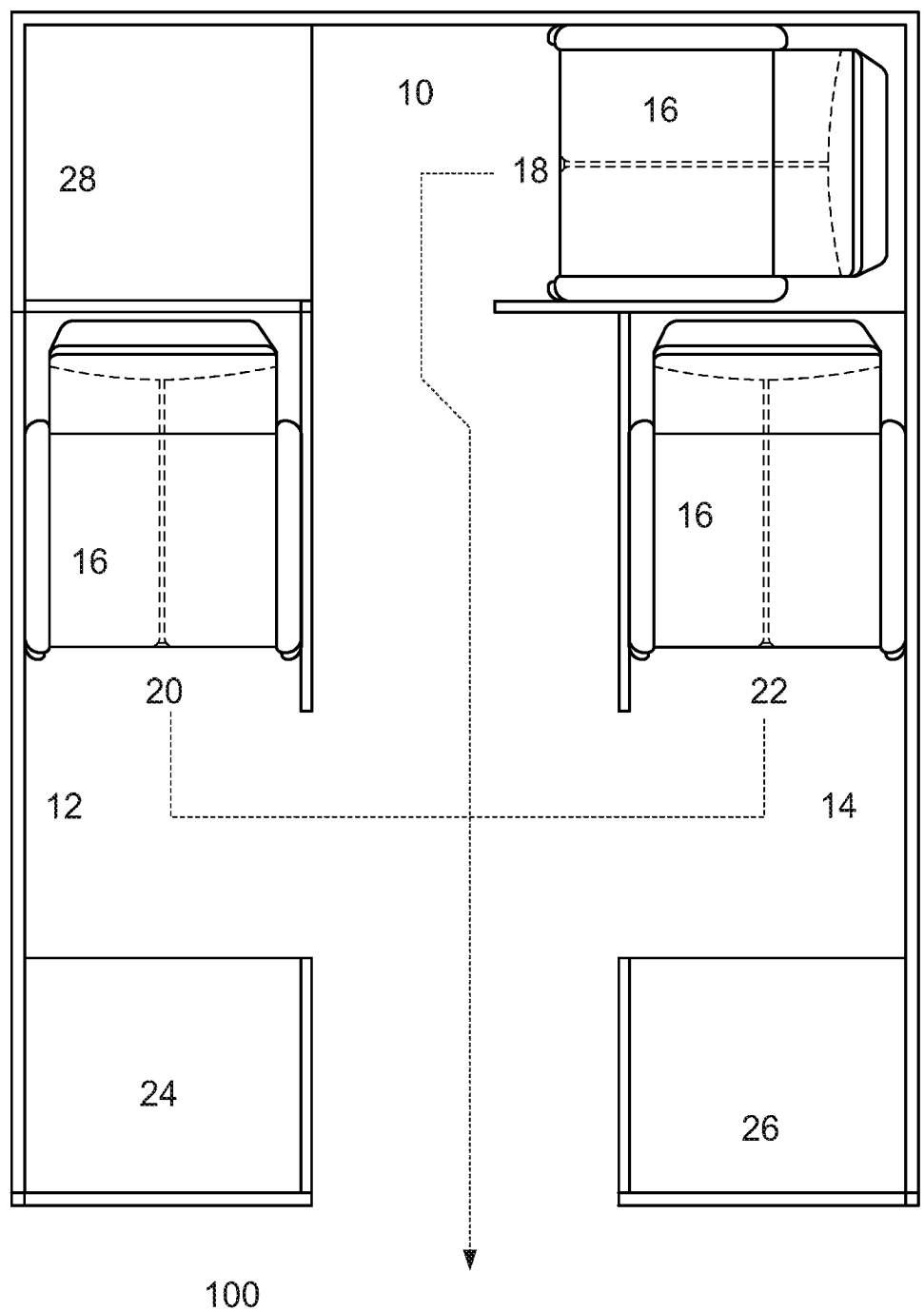
FIG. 15 is a top view of a triplet seating arrangement for aircraft passenger suites according to a ninth example embodiment.

In another example, access to each suite 10, 12, and 14 may not be impeded by the articulable ottoman and each suite 10, 12, and 14 may not require the articulation of the articulable ottoman and the articulable ottomans may be replaced by the fixed ottomans, as illustrated in FIG. 13 where spacing between each suite 10, 12, 14 is sufficiently large to allow access to the seats 16, and in FIGS. 19-20. Additionally, as illustrated in FIG. 13, the ottomans may be tapered at one side to provide increased aisle access.

In some embodiments, certain suites 10, 12, 14, 512, 510, 14a, 14b, 610, and 612 or sets of suites can also be equipped with a piece of furniture to enhance comfort and utilize available space that may be present between the suites 10, 12, 14, 512, 510, 14a, 14b, 610, and 612. For example, the piece of furniture can be a closet 19a to fit between the suites 12 and 14 and behind the suite 10, as illustrated in FIGS. 20, 24, and 38-39.

In another example, the piece of furniture can be a storage trunk 19b to fit between the suites 12 and 14 and behind the suite 10, as illustrated in FIG. 22.

In another example, the piece of furniture can be a triangular console 19c to utilize a space between the partition walls of suite 12 and suite 14, as illustrated in FIG. 22.

Figure 18:
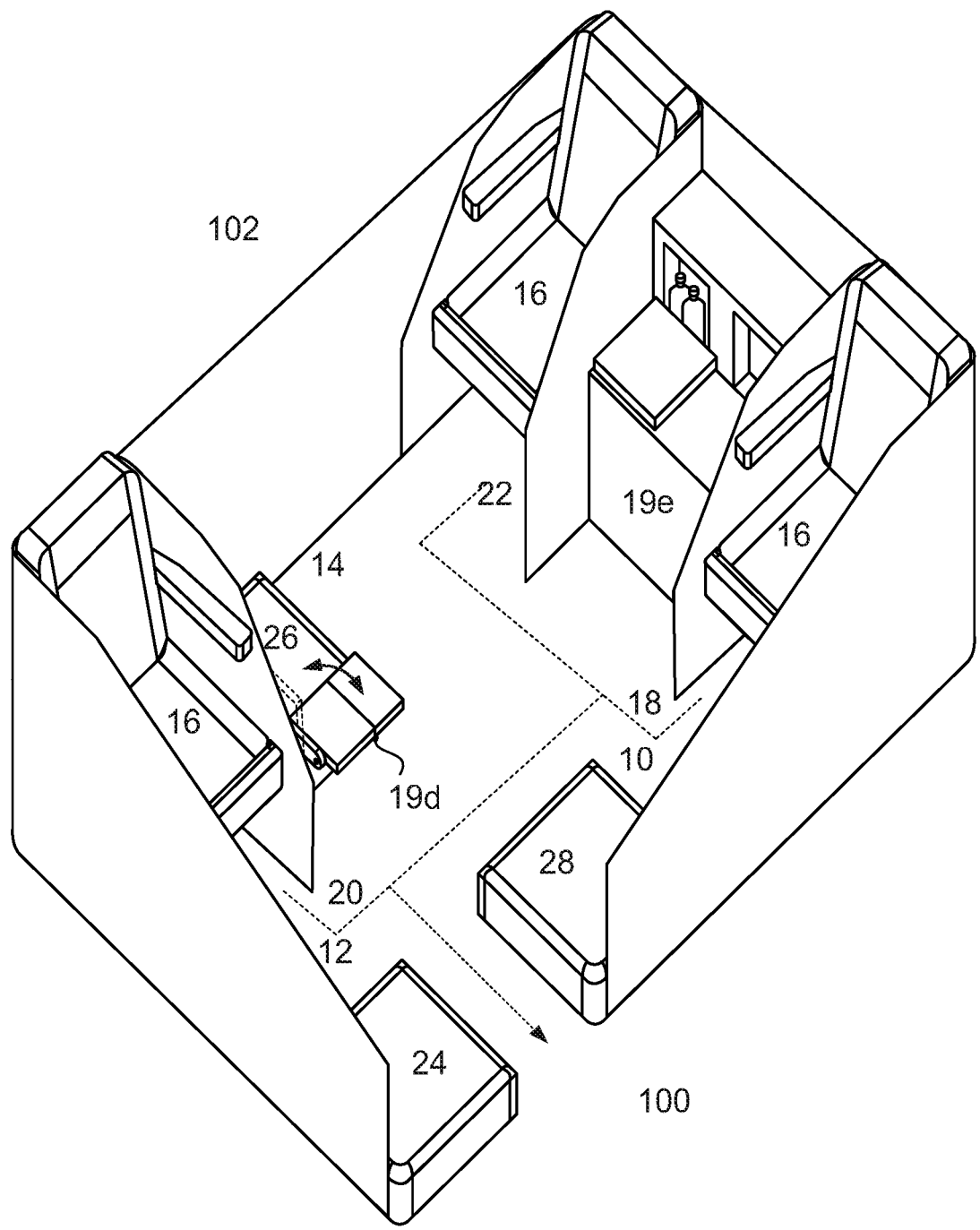
FIG. 18 is a perspective view of the triplet seating arrangement of FIG. 17.

In another example, the piece of furniture can be a deployable conference table 19d deployable within a space facing the suites 10, 12, and 14, as illustrated in FIG. 18, to facilitate access to the suites 10, 12, 14 while providing the passengers in suites 10, 12, 14 with shared conferencing space. In addition, the piece of furniture can be a beverage and snack station 19e placed laterally between the suites 14 and 10, and facing the suite 12 and the deployable conference table 19d, as illustrated in FIG. 18.

Figure 23:
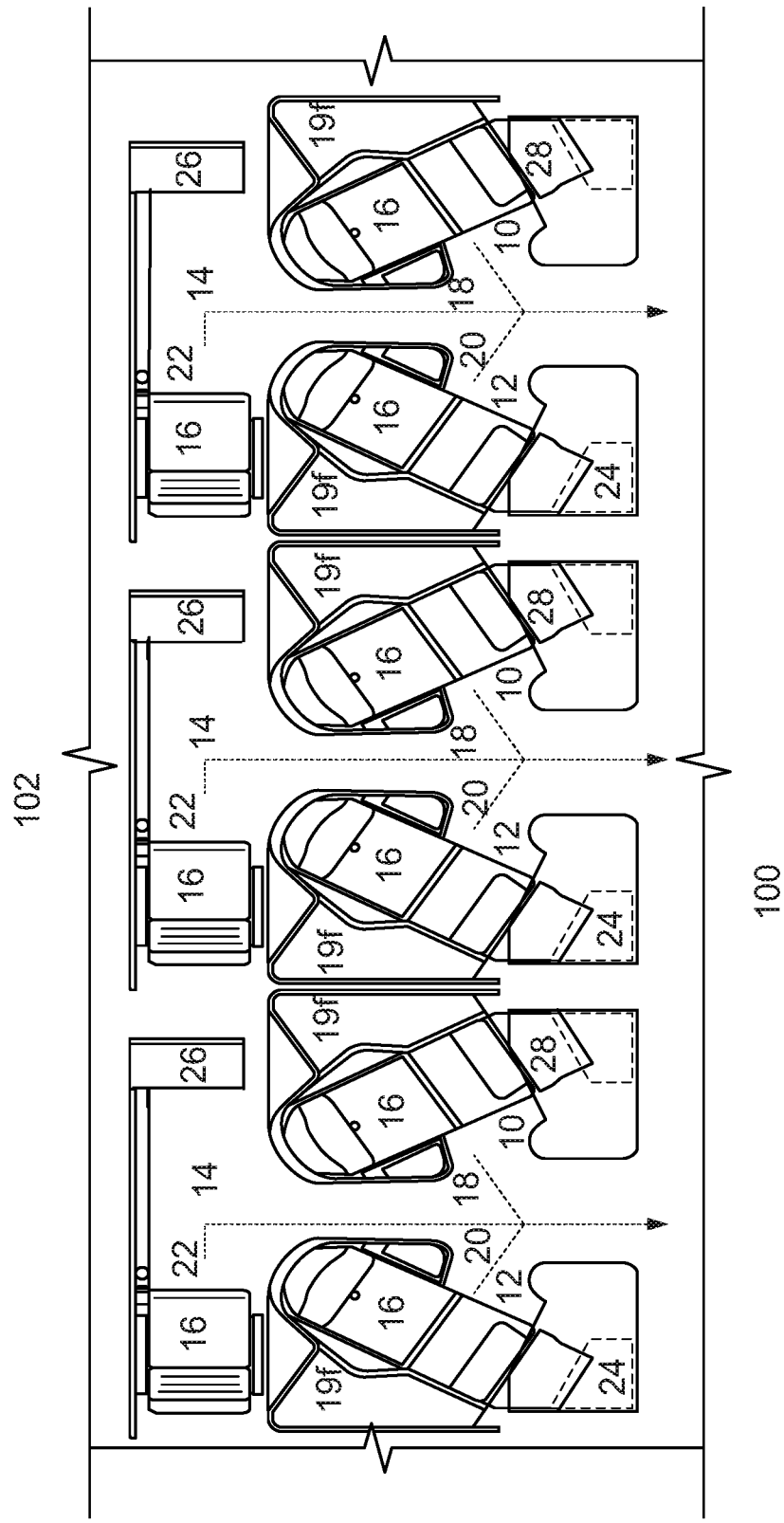
FIG. 23 is a top view of a triplet seating arrangement for aircraft passenger suites according to a fourteenth example embodiment.
Figure 24:
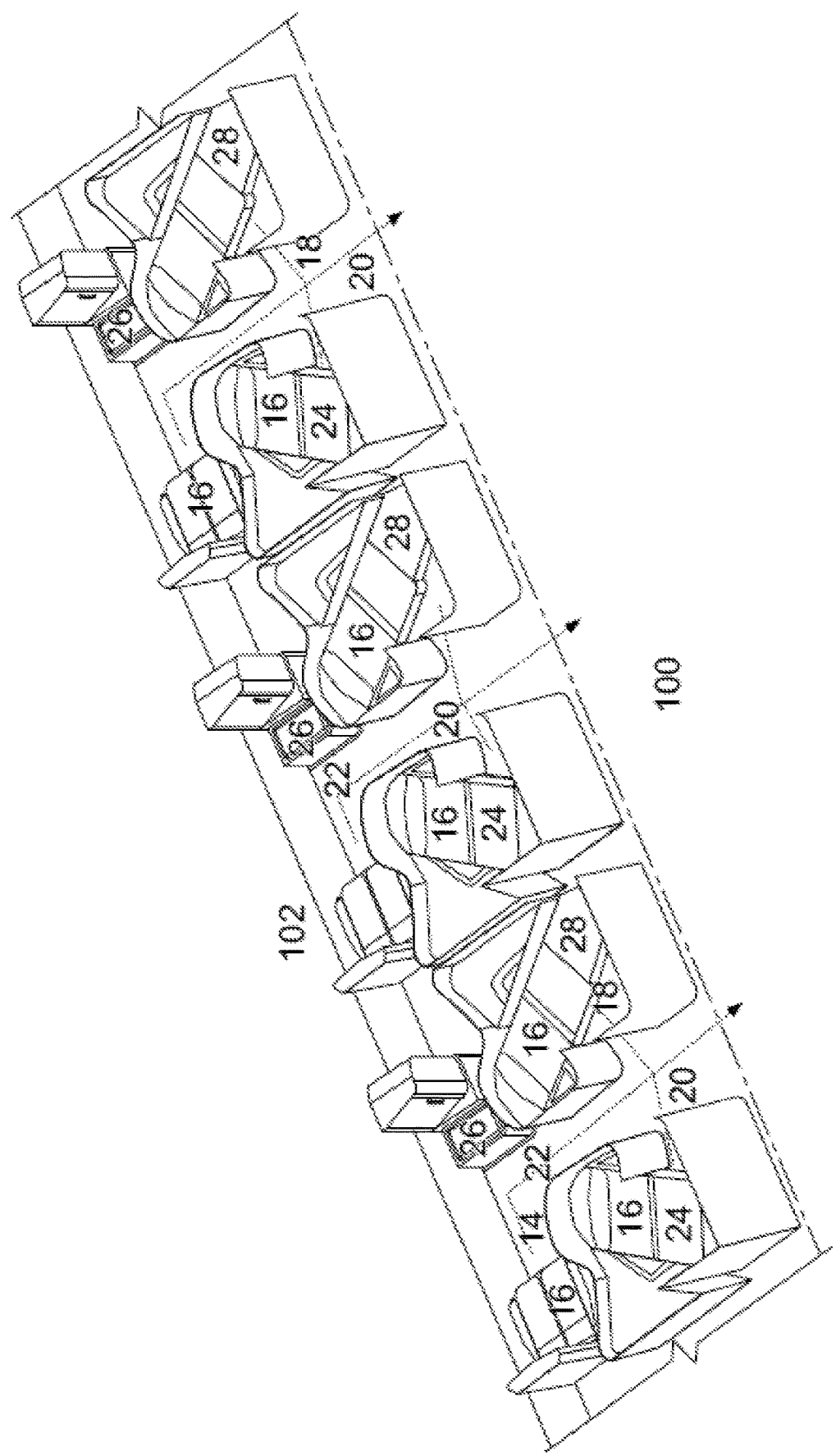
FIG. 24 is a perspective view of the triplet seating arrangement of FIG. 23.
Figure 25:
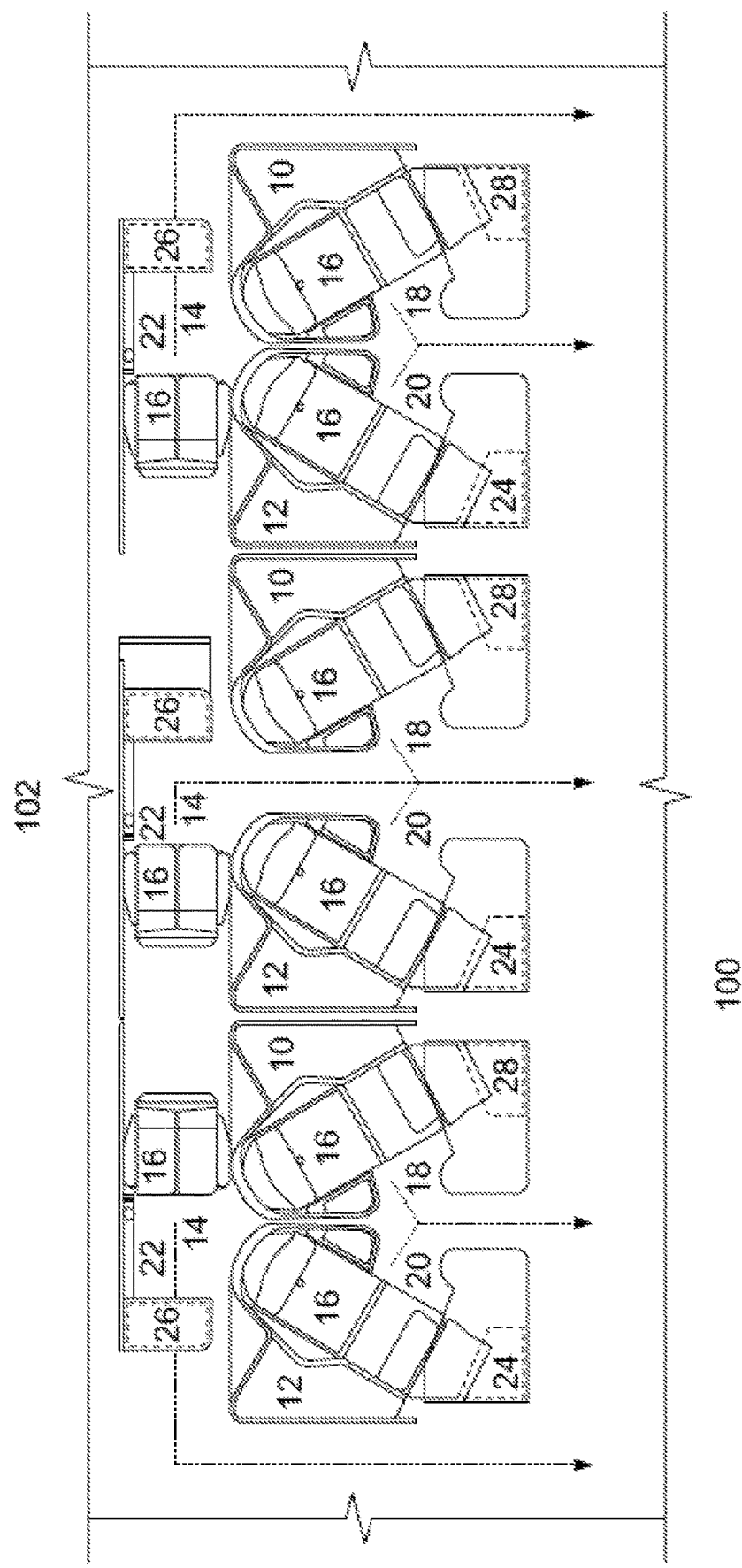
FIG. 25 is a top view of a triplet seating arrangement for aircraft passenger suites according to a fifteenth example embodiment.

In other example, the piece of furniture can be a work shelf 19f placed laterally adjacent to the seat 16 to provide a countertop surface for the passenger in the seat 16, as illustrated in FIGS. 23-24, and 29.

Figure 16:
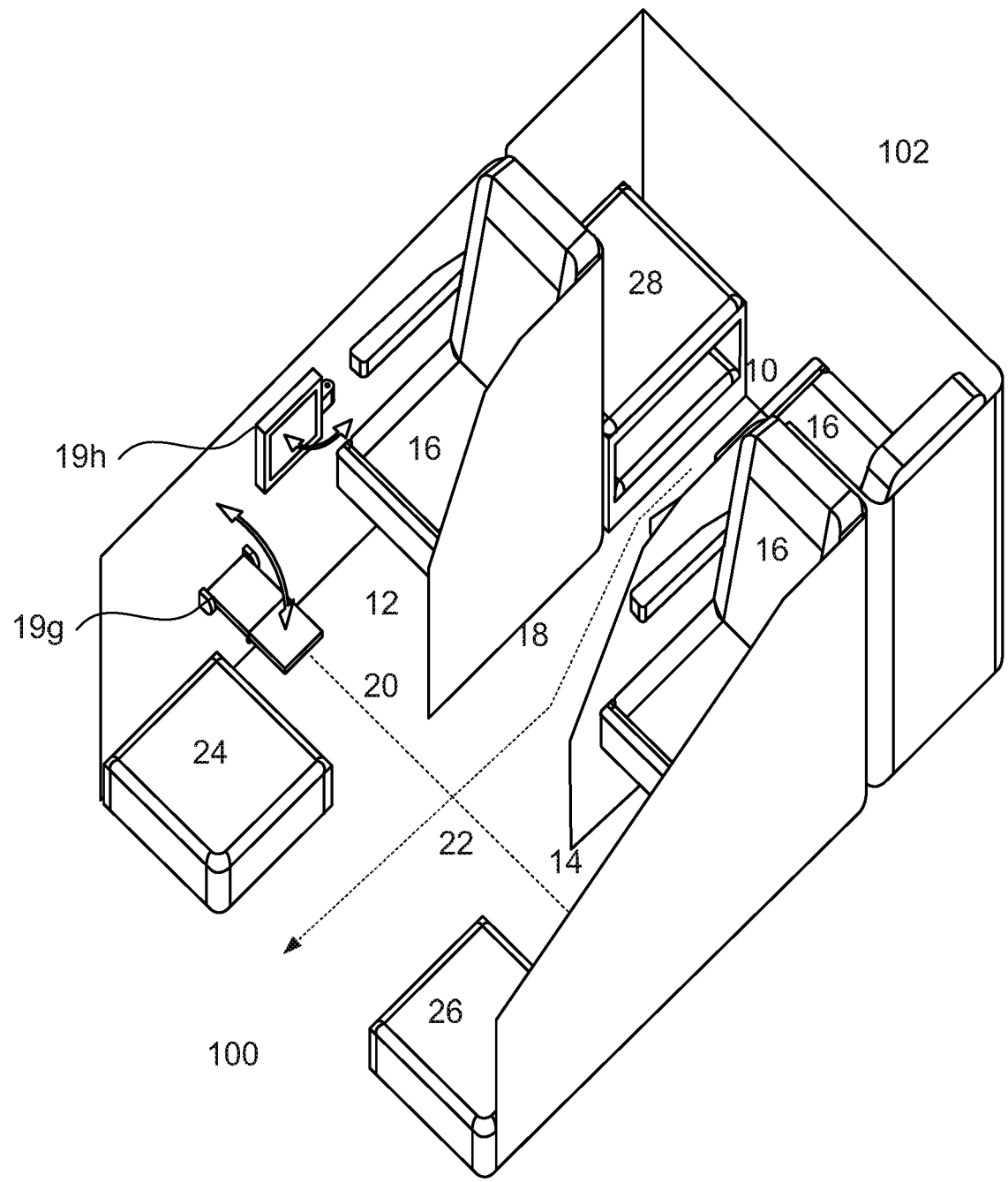
FIG. 16 is a perspective view of the triplet seating arrangement of FIG. 15.
Figure 17:
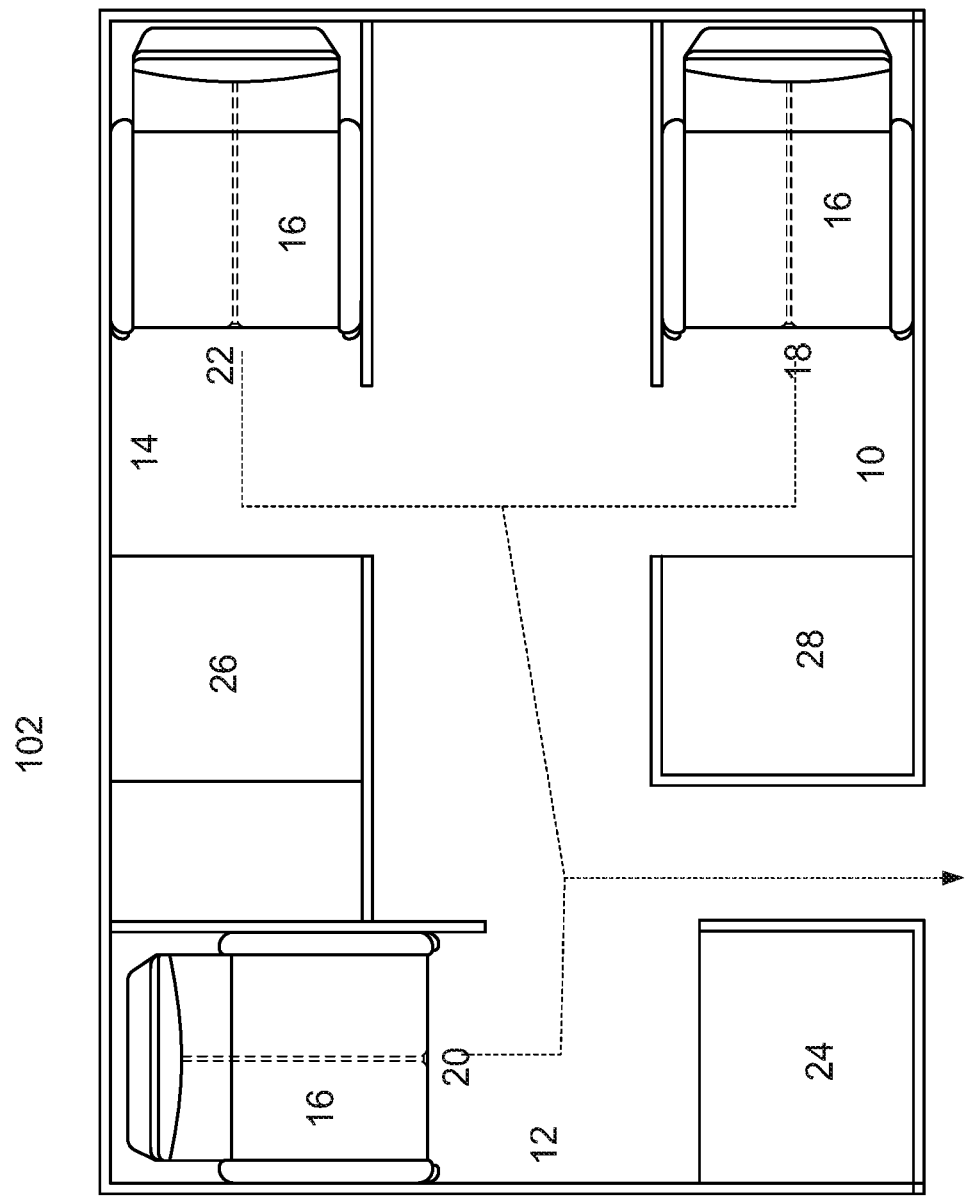
FIG. 17 is a top view of a triplet seating arrangement for aircraft passenger suites according to a tenth example embodiment.

In other example, the piece of furniture can be a visitor table 19g placed between the seat 16 and one of the ottomans 28, 24, and 26 to provide a workspace for a visiting passenger seated on the corresponding ottoman 24, 26, or 28, as illustrated in FIG. 16. The visitor table 19g can be hingedly and/or rotatably affixed to a wall of one of the suite 10, 12, and 14 and be articulable from a folded position, e.g., aligned against the wall to provide access to the seat 16, to an unfolded position, e.g. protruding from the wall to extend along ottoman 24, as illustrated in FIG. 16.

Figure 26:
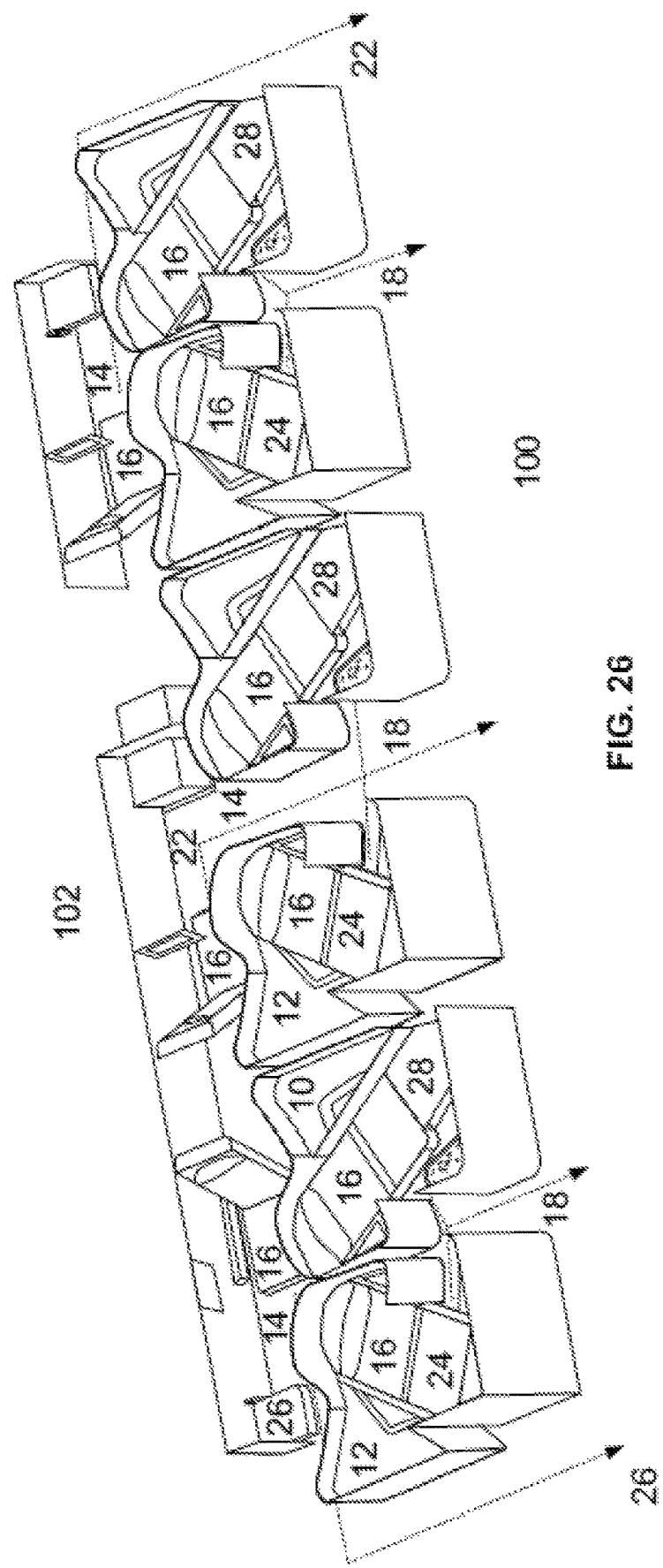
FIG. 26 is a perspective view of the triplet seating arrangements of FIG. 25.

In another example, the piece of furniture can be a swing out monitor 19h rotatably affixed to a wall of the suite 10, 12, or 14 and articulable from a folded position, e.g. aligned against the wall to provide access to the seat 16, to an unfolded position, e.g. protruding from the wall to face the seat 16 and to allow the passenger on the seat 16 to view the monitor screen, as illustrated in FIGS. 16 and 26.

In another example, the piece of furniture can be a shelve unit 19i protruding vertically from a ground surface of one of the suites 10, 12, and 14 and in front of the seat 16 to enhance privacy of the passengers, as illustrated in FIGS. 28-29.

FIGS. 40-44 are top views of exemplary seating arrangements for passenger suites on both sides of an aisle in an aircraft. For purposes of explanation, the aisle 40 will be described as extending from a forward portion of the cabin (depicted toward the bottom of the figures) to an aft portion of the cabin (depicted toward the top of the figures).

Figure 40:
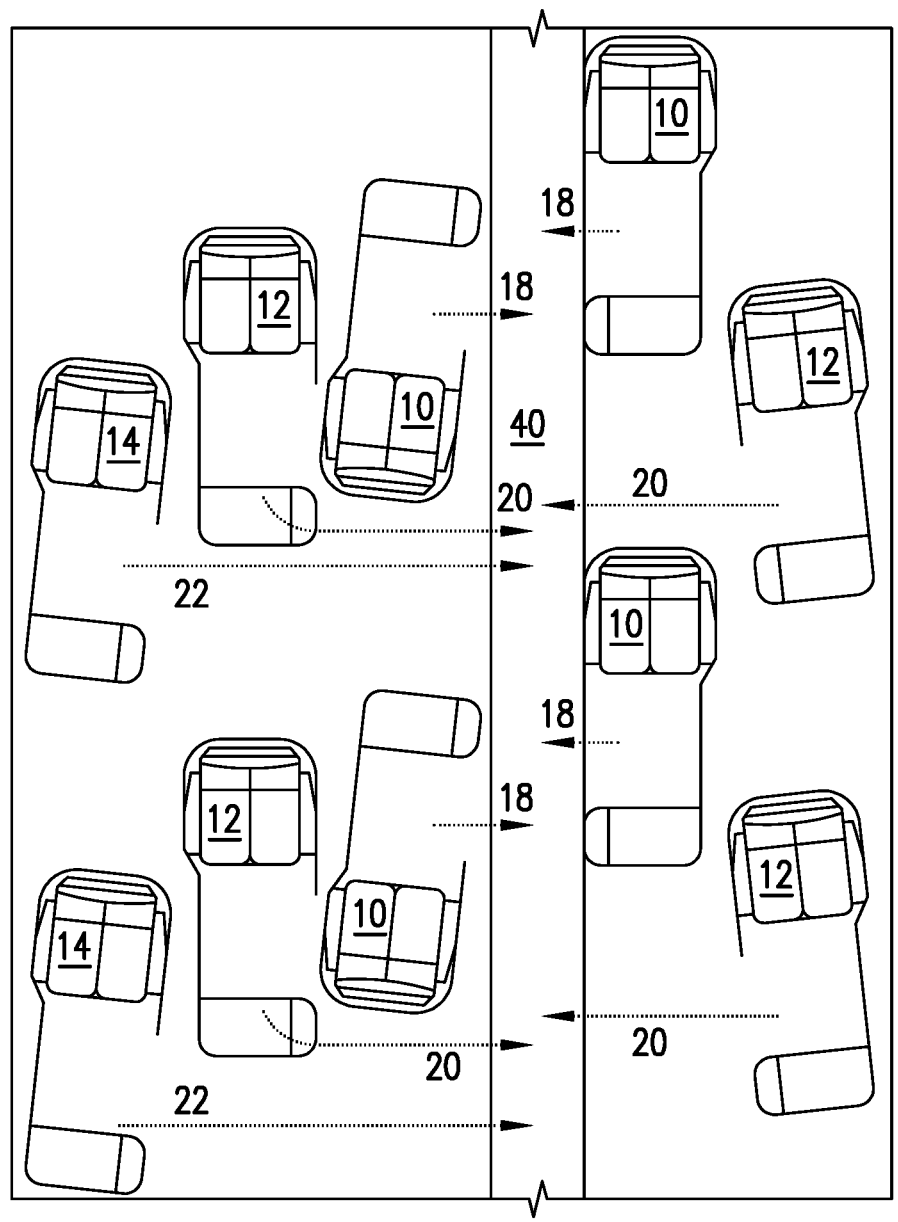
FIG. 40 is a top view of an exemplary seating arrangement for passenger suites on both sides of an aisle in an aircraft.

FIG. 40 depicts on the left side of the common shared aisle 40 two sets of three substantially rectangular suites 10, 12, 14. In the depicted example, the window suite 14 and the aisle suite 10 are substantially parallel and angled with respect to the corresponding middle suite 12, which is oriented to lie substantially parallel to the aisle 40. The window suite 14 entrance 22 is connected to the aisle 40 by a first access path that is forward of the suites 10, 12. The middle suite 12 entrance 20 is connected to the aisle 40 by a second access path that is forward of the suite 10. A portion of the first access path is shared with the second access path. The aisle suite 10 has an entrance 18 substantially proximate to the aisle 40.

On the right side of the aisle 40, FIG. 40 depicts two sets of two suites 10, 12. In the depicted example, the middle suite 12 is substantially angled with respect to the corresponding aisle suite 10, which is oriented to lie substantially parallel and adjacent to the aisle 40. The entrance 20 of suite 12 is connected to the aisle 40 by a third access path that is forward of the corresponding suite 10. The aisle suite 10 has an entrance 18 substantially adjacent to the aisle 40.

Figure 41:
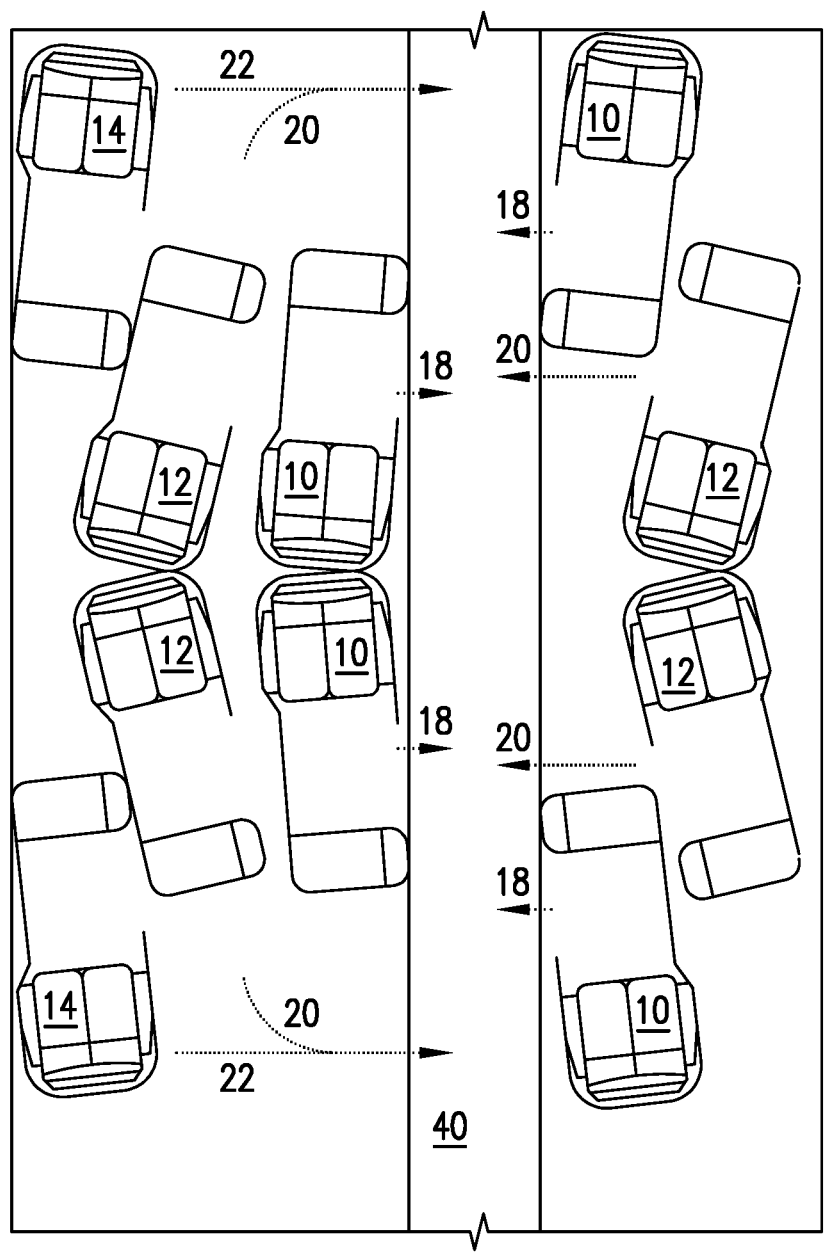
FIG. 41 is a top view of an exemplary seating arrangement for passenger suites on both sides of an aisle in an aircraft.

FIG. 41 depicts an exemplary seating arrangement that is substantially similar to FIG. 40 with the following variations.

The suites in the depicted figure are shaped with a tapered footprint, which may advantageously provide more room in the passenger seating area in each of the suites 10, 12, 14.

In this example, the sets of the suites 10, 12, 14 on the left side of the aisle 40 and the suites 10, 12 on the right side of the aisle 40 are arranged with an alternating symmetry such that the first, second and third access paths lie alternately aft and forward, respectively, in successive sets of suits along the aisle 40. As depicted, the aft set of suites are a mirror image of the forward sets of suites.

Figure 42:
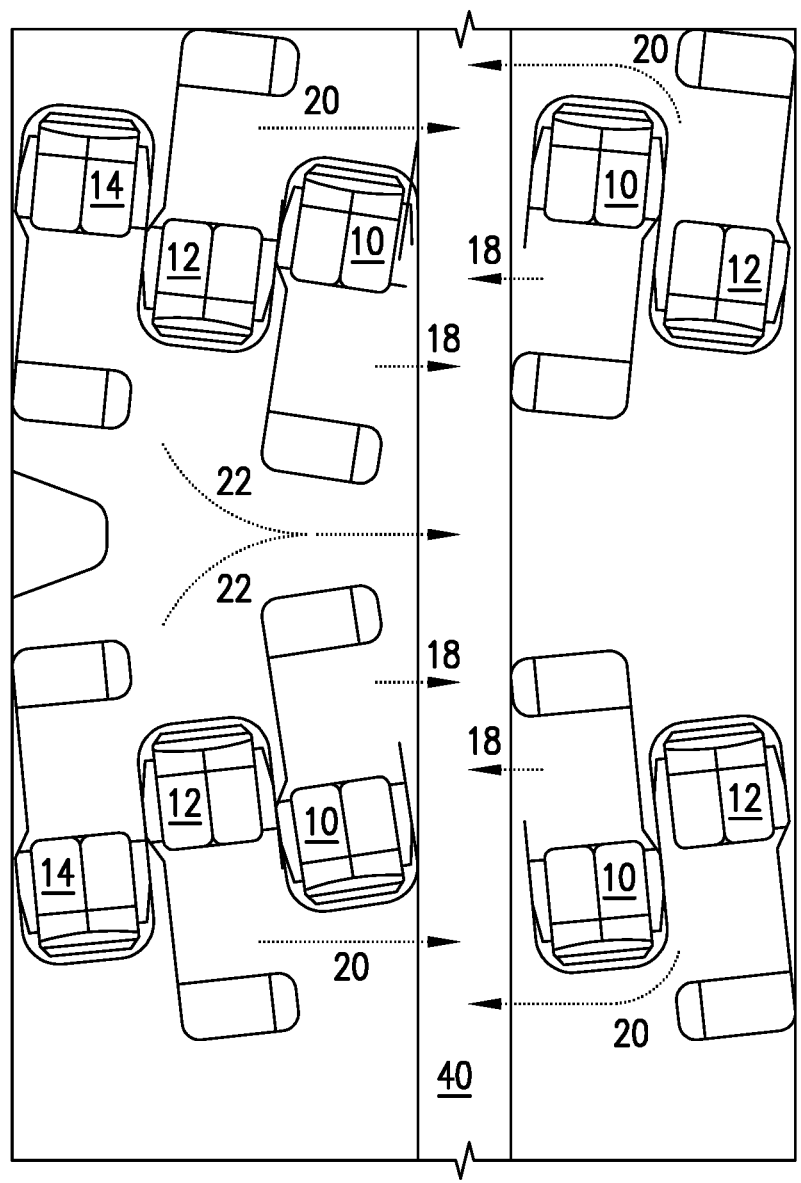
FIG. 42 is a top view of an exemplary seating arrangement for passenger suites on both sides of an aisle in an aircraft.

FIG. 42 depicts an exemplary seating arrangement that is substantially similar to FIG. 41 with the following variations. The forward and aft suites in the depicted figure on the left side of the aisle 40 share a common access path from the suites 14 and the suites 12. The forward and aft suites in the depicted figure on the left side of the aisle 40 do not share a common access path. The forward suite 12 has an access path forward of the suite 10. The aft suite 12 has an access path aft of the suite 10.

Figure 43:
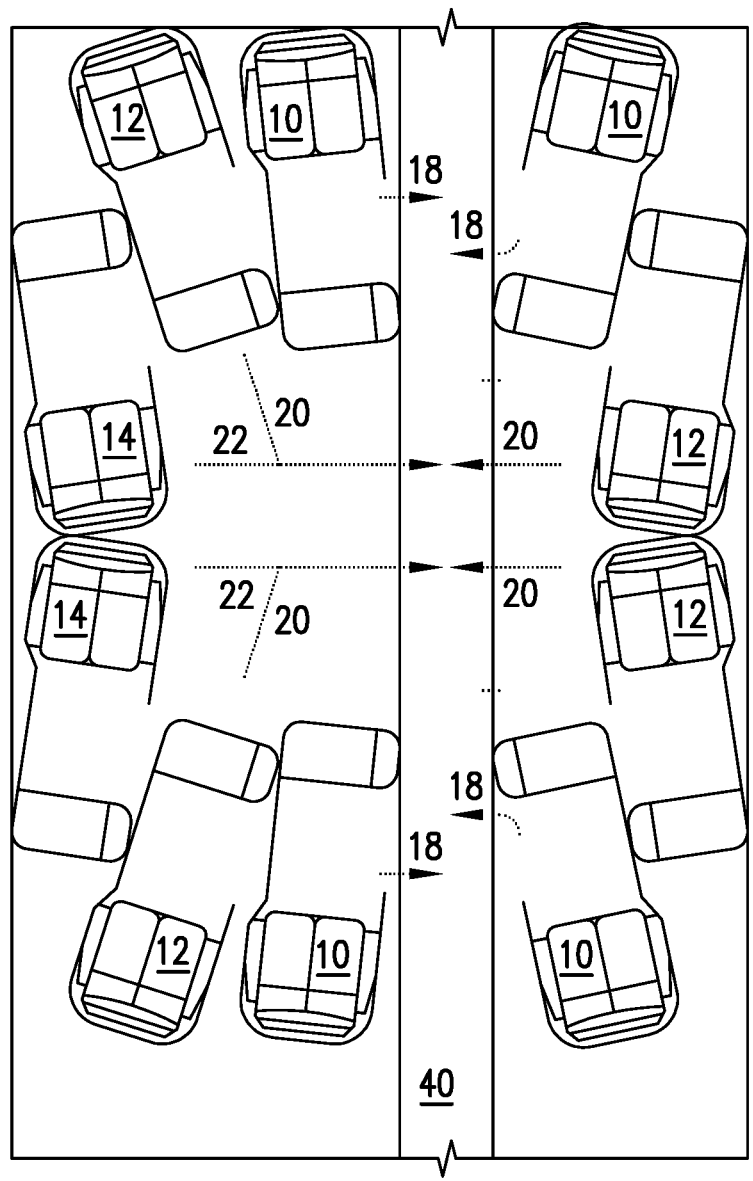
FIG. 43 is a top view of an exemplary seating arrangement for passenger suites on both sides of an aisle in an aircraft.

FIG. 43 depicts an exemplary seating arrangement that provides a mirror imaged aft and forward sets of suites on both the left and right sides of the aisle 40. The suites 10, 12 and 14 are each tapered to fit within an overall rectangular (e.g., modular) footprint that encompasses all of the depicted suites in FIG. 43. The entrances of the suites 12, 14 on the left side and the right-most suite 12 on the right side of the aisle 40 are located along a lateral axis that bisects the aft and forward suites. On the left side of the aisle 40, forward suites 12, 14 share a common access path with the aft suites 12, 14. On the right side of the aisle 40, forward suite 12 shares a common access path with the aft suite 12. The common access paths are directly across from each other on the left and right sides of the aisle 40.

For purposes of explanation, the aisle 100 will be described as extending from a forward portion of the cabin (depicted toward the left of the FIG. 44) to an aft portion of the cabin (depicted toward the right of the FIG. 44).

Figure 44:
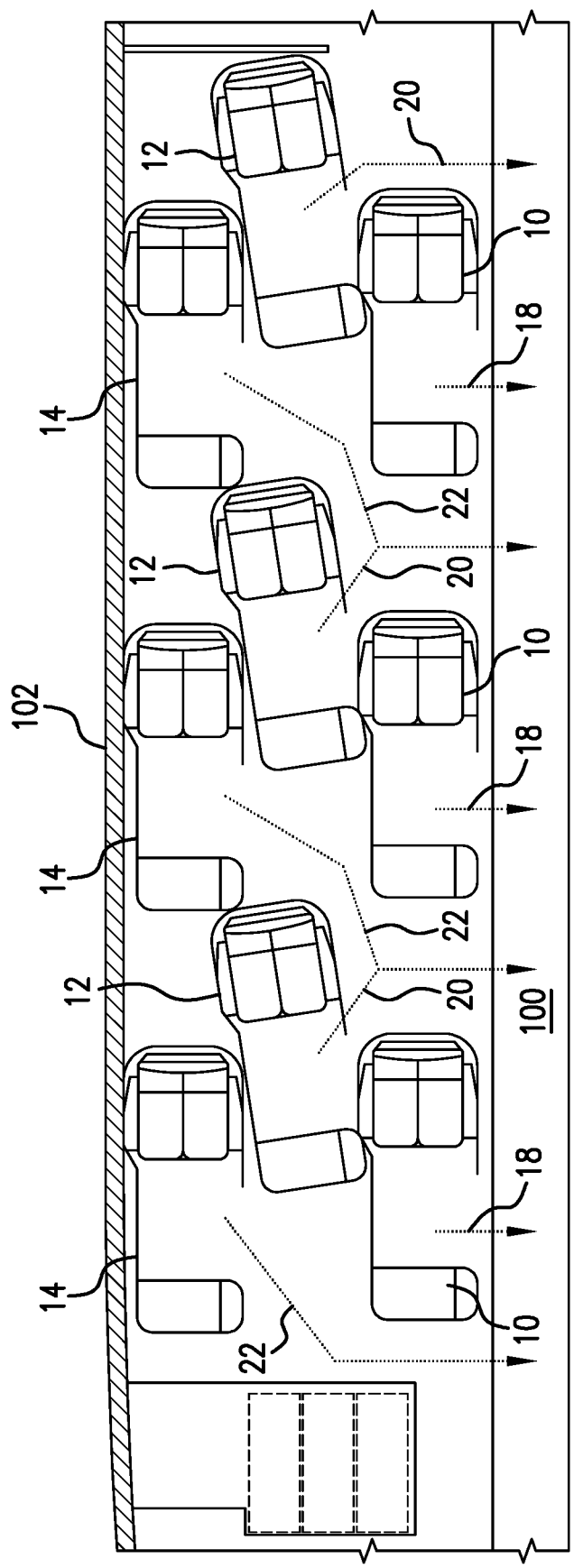
FIG. 44 is a top view of an exemplary seating arrangement for passenger suites on both sides of an aisle in an aircraft.

FIG. 44 depicts an exemplary seating arrangement that provides successive rows of the suites 10, 12, 14, with the corresponding middle suite 12 interstitially offset between adjacent rows so that the entrance 20 is connected to the aisle 100 via an access path that runs between the corresponding first aisle suite 10 and a second aisle suite 10 in the adjacent row aft of the corresponding aisle suite 10. The suites 10, 14 are oriented substantially parallel to each other and a longitudinal axis of the aircraft, which is also parallel to the aisle 100. The middle suite 12 is angled with the aft portion of the middle suite 12 laterally shifted outboard relative to the forward portion of the middle suite. In the depicted example, the middle suite 12 is also tapered with the forward portion narrower than the aft portion.

The window suite 14 in the second row (which is aft of the first row, as depicted) has an access path to the aisle 100 lying between the aft ends of the suites 10, 12 in the first row and the forward ends of the suites 10, 12 in the second row.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A seating arrangement for a cabin of a passenger aircraft having a longitudinal cabin aisle, comprising:
   first, second and third suites each including a privacy wall and a seat movable between a seating position and a lie-flat bed position, and adapted to be laterally positioned in the aircraft cabin to one side of the longitudinal cable aisle in respective laterally-adjacent outboard, middle and inboard positions, wherein the seats in the first, second and third suites are parallel, and wherein seatbacks of the two of the seats are positioned aligned in a first lateral plane a seatback of the third seat is positioned longitudinally offset relative to the lateral plane;
   the first, second and third suites positioned in a longitudinally-offset position in relation to each other, each of the first, second and third suites having a dedicated entrance with the entrance to the first suite leading into a shared aisle branching from the longitudinal cabin aisle, the entrance to the second suite leading to the shared aisle, and the entrance to the third suite leading directly to the longitudinal cabin aisle;
   a longitudinal axis of at least one of the first, second and third suites defining an angular offset relative to a longitudinal axis of the cabin aisle; and
   the privacy wall of each of the first, second and third suites having at least two wall segments positioned at respective non-parallel angles relative to each other.

2. The seating arrangement according to claim 1, wherein at least one of the first, second and third suites faces in an aft direction relative to the aircraft cabin.

3. The seating arrangement according to claim 1, wherein each of the first, second and third suites includes a respective ottoman positioned in spaced-apart relation to the seat for forming with the seat a lie-flat bed.

4. The seating arrangement according to claim 1, wherein the shared aisle is perpendicular to the longitudinal cabin aisle.

5. The seating arrangement according to claim 1, wherein the first and second suites are positioned in parallel fore and aft alignment relative to each other, and the third suite is positioned in a longitudinally offset, parallel fore and aft alignment with the first and second suites.

6. The seating arrangement according to claim 1, wherein each of the first, second and third suites face in the same general forward or aft direction in the cabin.

* * * * *